United States Patent
Yawata et al.

(10) Patent No.: US 9,876,254 B2
(45) Date of Patent: Jan. 23, 2018

(54) NON-AQUEOUS LIQUID ELECTROLYTE FOR SECONDARY BATTERY AND NON-AQUEOUS LIQUID ELECTROLYTE SECONDARY BATTERY

(71) Applicant: FUJIFILM Corporation, Tokyo (JP)

(72) Inventors: Toshihiko Yawata, Kanagawa (JP); Ikuo Kinoshita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 459 days.

(21) Appl. No.: 14/566,118

(22) Filed: Dec. 10, 2014

(65) Prior Publication Data

US 2015/0099192 A1    Apr. 9, 2015

(30) Foreign Application Priority Data

Jun. 20, 2012  (JP) .................. 2012-138735

(51) Int. Cl.
| | | |
|---|---|---|
| *H01M 10/0567* | (2010.01) | |
| *H01M 10/052* | (2010.01) | |
| *H01M 10/42* | (2006.01) | |
| H01M 10/0569 | (2010.01) | |
| H01M 4/505 | (2010.01) | |
| H01M 4/525 | (2010.01) | |

(52) U.S. Cl.
CPC ..... *H01M 10/0567* (2013.01); *H01M 10/052* (2013.01); *H01M 10/4235* (2013.01); *H01M 4/505* (2013.01); *H01M 4/525* (2013.01); *H01M 10/0569* (2013.01); *H01M 2300/0025* (2013.01); *H01M 2300/0037* (2013.01)

(58) Field of Classification Search
CPC ......... H01M 10/0567; H01M 10/0569; H01M 10/052; H01M 10/4235; H01M 4/505; H01M 4/52; H01M 4/525; H01M 2300/0025; H01M 2300/0037
See application file for complete search history.

(56) References Cited

U.S. PATENT DOCUMENTS

| | | | |
|---|---|---|---|
| 2004/0126658 A1 | 7/2004 | Otsuki et al. | |
| 2007/0015048 A1 | 1/2007 | Lee et al. | |
| 2011/0117443 A1* | 5/2011 | Lee .................. | H01M 10/0567 429/328 |
| 2014/0377668 A1* | 12/2014 | Abe .................. | H01M 10/0567 429/332 |
| 2015/0125761 A1* | 5/2015 | Shimamoto ....... | H01M 10/0567 429/338 |

FOREIGN PATENT DOCUMENTS

| | | |
|---|---|---|
| JP | 11-317232 A | 11/1999 |
| JP | 2009-501419 A | 1/2009 |
| JP | 2011-108649 A | 6/2011 |
| JP | 2012-234771 A | 11/2012 |
| WO | 02/082575 A1 | 10/2002 |

OTHER PUBLICATIONS

International Search Report of PCT/JP2013/065976 dated Aug. 27, 2013.

* cited by examiner

*Primary Examiner* — Laura Weiner
(74) *Attorney, Agent, or Firm* — Sughrue Mion, PLLC

(57) ABSTRACT

A non-aqueous liquid electrolyte for a secondary battery, containing, in an aprotic solvent: an electrolyte; a particular nitrile compound; and a flame retardant composed of a particular phosphate compound or a phosphazene compound, in which the nitrile compound is contained in an amount of 0.1 parts by mass to 10 parts by mass with respect to 100 parts by mass of the flame retardant.

9 Claims, 2 Drawing Sheets

NON-AQUEOUS LIQUID ELECTROLYTE FOR SECONDARY BATTERY AND NON-AQUEOUS LIQUID ELECTROLYTE SECONDARY BATTERY

CROSS-REFERENCE TO RELATED APPLICATIONS

This application is a Continuation of PCT International Application No. PCT/JP2013/065976 filed on Jun. 10, 2013, which claims priority under 35 U.S.C. § 119 (a) to Japanese Patent Application No. 2012-138735 filed in Japan on Jun. 20, 2012. Each of the above applications is hereby expressly incorporated by reference, in its entirety, into the present application.

FIELD OF THE INVENTION

The present invention relates to a non-aqueous liquid electrolyte for a secondary battery, and to a non-aqueous liquid electrolyte secondary battery.

BACKGROUND ART

Secondary batteries called lithium ion batteries, currently attract much attention. Those batteries can be roughly classified into two categories of so called lithium ion secondary batteries and lithium metal secondary batteries. The lithium metal secondary batteries utilize precipitation and dissolution of lithium for the operation. On the other hand, the lithium ion secondary batteries utilize storage and release of lithium in the charge-discharge reaction. These batteries each can realize charge-discharge at large energy densities, as compared to lead batteries or nickel-cadmium batteries. By making use of those characteristics, in recent years, these batteries have been widely applied to portable electronic equipment, such as camera-integrated VTR's (video tape recorders), mobile phones, and notebook computers. In accordance with a further expansion of applications, the development of lightweight secondary batteries, which can allow higher energy densities, has been advanced, as power sources of the portable electronic equipment. Furthermore, there is a strong demand for size reduction, service life prolongation, and safety enhancement.

Regarding a liquid electrolyte, a particular combination of materials has widely been employed, for lithium ion secondary batteries or lithium metal secondary batteries (hereinafter, these may be collectively referred to simply as a lithium ion secondary battery). That is, a carbonic acid ester-based solvent, such as propylene carbonate or diethyl carbonate, is employed, in combination with an electrolyte salt, such as lithium hexafluorophosphate. This is because these compounds have a high electric conductivity and also these are potentially stable.

On the other hand, the conventional liquid electrolyte contains the aforementioned low-molecular weight organic compounds as the components. Thus, it is important to impart flame retardancy to the liquid electrolyte, from the viewpoint of safety. For the purpose of achieving improvement in this respect, a technique has been proposed to add a cyclic phosphazene or a phosphate compound into the liquid electrolyte (see Patent Literatures 1 to 3).

CITATION LIST

Patent Literatures

Patent Literature 1: WO 2002/082575
Patent Literature 2: JP-A-2011-108649 ("JP-A" means unexamined published Japanese patent application)
Patent Literature 3: JP-A-11-317232

SUMMARY OF THE INVENTION

Problems that the Invention is to Solve

Certainly, a cyclic phosphazene and a phosphate compound have the effects of imparting flame retardancy, and therefore addition thereof to a liquid electrolyte is a very useful technique to enable enhancement in both safety and reliability of the resultant lithium secondary battery. On the other hand, however, the inventors of the present invention have come to see, as a result of our understanding, that these flame retardants generate impurities in the use thereof, which become a factor for lowering in cycling characteristics and the like.

The present invention is contemplated for providing: a non-aqueous liquid electrolyte for a secondary battery, which suppresses generation of impurities derived from a particular flame retardant, thereby for achieving both of a flame retardancy and a good battery performance at a high level, when using a liquid electrolyte containing the aforementioned flame retardant; and a non-aqueous liquid electrolyte secondary battery.

Means to Solve the Problem

The above-described problems of the present invention were solved by the following means.
[1] A non-aqueous liquid electrolyte for a secondary battery, containing, in an aprotic solvent:
an electrolyte;
a nitrile compound represented by formula (1); and
a flame retardant composed of a phosphate compound represented by formula (2) or a phosphazene compound,
wherein the nitrile compound is contained in an amount of 0.1 parts by mass to 10 parts by mass with respect to 100 parts by mass of the flame retardant:

(1)

wherein $R^{11}$ to $R^{13}$ each independently represent a hydrogen atom, an alkyl group, an alkoxycarbonyl group, an aryloxycarbonyl group, a cyano group, a carbamoyl group, a sulfonyl group, a halogen atom, or a phosphony group; $R^{11}$ to $R^{13}$ each may have a cyano group; and n represents an integer of from 1 to 8; and (2)

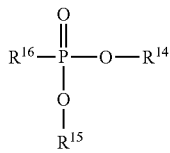

wherein $R^{14}$ and $R^{15}$ each represent an alkyl group or an aryl group, each of which may be substituted; and $R^{16}$ represents an alkyl group, an aryl group, an alkoxy group, or an aryloxy group.

[2] The non-aqueous liquid electrolyte for a secondary battery as described in the item [1], wherein a positive electrode of a secondary battery to be applied contains an active material having manganese or nickel.

[3] The non-aqueous liquid electrolyte for a secondary battery as described in the item [1] or [2], wherein the phosphazene compound is represented by formula (3):

(3)

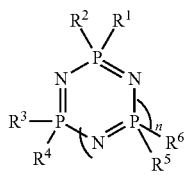

wherein $R^1$ to $R^6$ each represent a monovalent substituent; and n represents an integer of 1 or more.

[4] The non-aqueous liquid electrolyte for a secondary battery as described in any one of the items [1] to [3], wherein the phosphazene compound is represented by formula (3A) or (3B):

(3A)

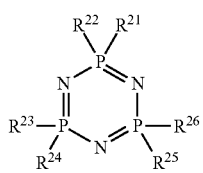

(3B)

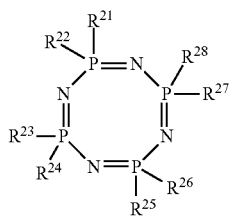

wherein $R^{21}$ to $R^{28}$ each represent a monovalent substituent.

[5] The non-aqueous liquid electrolyte for a secondary battery as described in the item [4], wherein, in formulas (3A) and (3B), $R^{21}$ to $R^{28}$ each represent an alkyl group, an alkoxy group, an amino group, a fluorine atom, or a combination thereof.

[6] The non-aqueous liquid electrolyte for a secondary battery as described in any one of the items [1] to [5], wherein the aprotic solvent is a compound represented by any one of formula (4A), (4B), or (4C), or a combination thereof:

(4A)

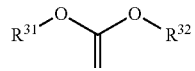

(4B)

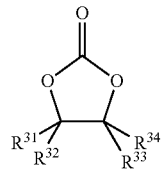

(4C)

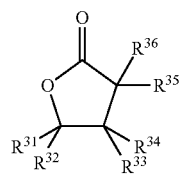

wherein $R^{31}$ to $R^{36}$ each represent a hydrogen atom, an alkyl group, or an aryl group.

[7] The non-aqueous liquid electrolyte for a secondary battery as described in any one of the items [1] to [6], wherein the nitrile compound is malononitrile, succinonitrile, glutaronitrile, or adiponitrile.

[8] A non-aqueous liquid electrolyte secondary battery, comprising:

the non-aqueous liquid electrolyte for a secondary battery as described in any one of the items [1] to [7];

a positive electrode; and a negative electrode.

[9] The non-aqueous liquid electrolyte secondary battery as described in the item [8], wherein the positive electrode contains an active material having manganese or nickel.

[10] An additive kit for a non-aqueous liquid electrolyte for a secondary battery, containing an electrolyte in an aprotic solvent, wherein a chemical agent containing a nitrile compound represented by formula (1) is contained in combination with a flame retardant composed of a phosphate compound represented by formula (2) or a phosphazene compound, in which the nitrile compound is contained in an amount of from 0.1 parts by mass to 10 parts by mass with respect to 100 parts by mass of the flame retardant:

(1)

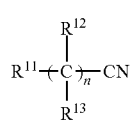

wherein $R^{11}$ to $R^{13}$ each independently represent a hydrogen atom, an alkyl group, an alkoxycarbonyl group, an aryloxycarbonyl group, a cyano group, a carbamoyl group, a sulfonyl group, a halogen atom, or a phosphony group; $R^{11}$ to $R^{13}$ each may have a cyano group; and n represents an integer of from 1 to 8; and

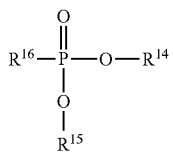

(2)

wherein $R^{14}$ and $R^{15}$ each represent an alkyl group or an aryl group, each of which may be substituted; and $R^{16}$ represents an alkyl group, an aryl group, an alkoxy group, or an aryloxy group.

In the present specification, when a plurality of substituents and the number of substituents are defined at the same time, these may be different from each other. Further, the substituents adjacent to each other may be bonded or condensed with each other to form a ring.

Advantageous Effects of the Invention

The non-aqueous liquid electrolyte for a secondary battery and the non-aqueous liquid electrolyte secondary battery, each of the present invention, suppress generation of impurities derived from a particular flame retardant, when a liquid electrolyte containing the flame retardant is used, thereby for achieving a balance between a flame retardancy and a good battery performance at a high level. Further, those liquid electrolyte and secondary battery of the present invention each exhibit particularly remarkable effects at the time of using a high-potential positive-electrode containing manganese or nickel, in particular.

Other and further features and advantages of the invention will appear more fully from the following description, appropriately referring to the accompanying drawings.

MODE FOR CARRYING OUT THE INVENTION

Figure 1:
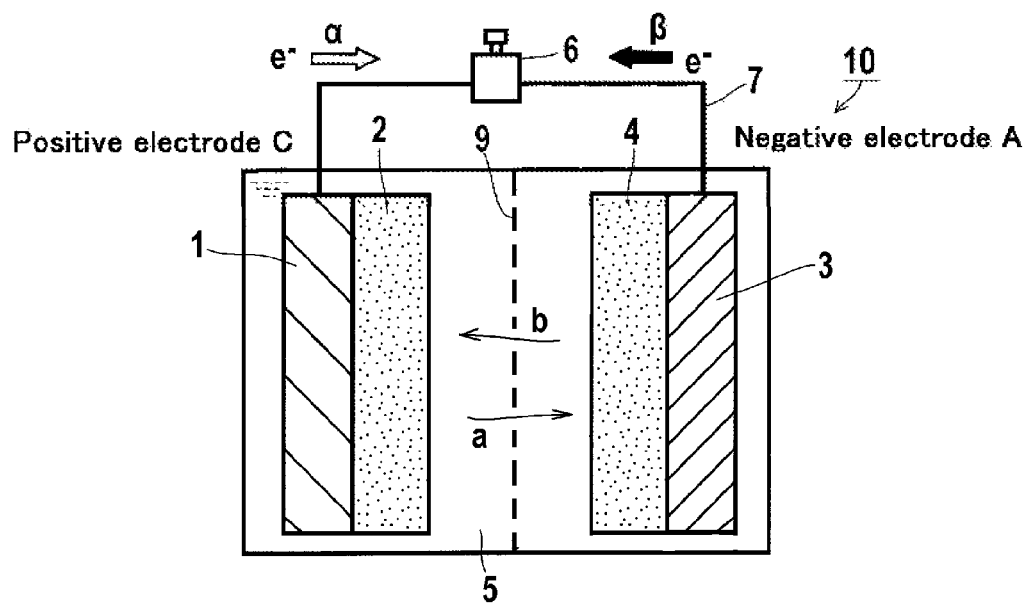
FIG. 1 is a cross-sectional diagram schematically illustrating a mechanism of a lithium secondary battery according to a preferable embodiment of the present invention, by modeling.

The liquid electrolyte of the present invention, which is used in the non-aqueous liquid electrolyte secondary battery, contains a particular flame retardant and a particular nitrile compound in an aprotic solvent. This makes it possible to maintain enhancing effects on flame retardancy of the liquid electrolyte containing the flame retardant, thereby for suppressing lowering in cycling characteristics, and to satisfy in both properties at a high level. The reasons for this include an unclear point, but are described below, while including presumption. That is to say, it is presumed that decomposition of the flame retardant is suppressed under the electrolytic oxidation/reduction conditions, by the action of an active site of the flame retardant compound with a cyano group of the particular nitrile compound. In the case of using a high-potential positive electrode having manganese or nickel in particular, it is considered that a (preferably 2 or more) cyano group acts with a positive electrode surface (preferably at two or more points), thereby for decreasing contact of active points of the positive electrode surface with the flame retardant, and therefore the remarkable effects are appeared. It is considered that generation of impurities is suppressed by those effects, so that the buttery effects become higher.

Hereinafter, the present invention is explained in detail, based on preferable embodiments thereof.

[Flame Retardant]

In the present invention, the flame retardant composed of the phosphate compound represented by formula (2) or the phosphazene compound is contained, in the non-aqueous liquid electrolyte for a secondary battery.

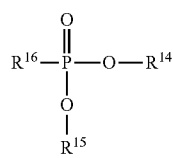

(2)

$R^{14}$ and $R^{15}$

In formula (2), $R^{14}$ and $R^{15}$ each represent an alkyl group or an aryl group, each of which may be substituted. Examples of the alkyl group and the aryl group include those exemplified as the substituent T described below. Of these, the alkyl group is preferably a methyl group, an ethyl group, a propyl group, an isopropyl group, a trifluoromethyl group, a trifluoroethyl group, an ethoxymethyl group, or a methoxymethyl group. The aryl group is preferably a phenyl group, a naphthyl group, a tolyl group, a methoxyphenyl group, or a fluorophenyl group.

$R^{16}$ $R^{16}$ represents an alkyl group, an aryl group, an alkoxy group, or an aryloxy group. Examples of the alkyl group, the aryl group, the alkoxy group and the aryloxy group include those exemplified as the substituent T described below. Of these, the alkyl group is preferably a methyl group, an ethyl group, a propyl group, an isopropyl group, a trifluoromethyl group, a trifluoroethyl group, an ethoxymethyl group, or a methoxymethyl group. The aryl group is preferably a phenyl group, a naphthyl group, a tolyl group, a methoxyphenyl group, or a fluorophenyl group. The alkoxy group is preferably a methoxy group, an ethoxy group, a propoxy group, an isopropoxy group, a trifluoromethoxy group, a trifluoroethoxy group, an ethoxymethoxy group, or a methoxymethoxy group. The aryloxy group is preferably a phenoxy group, a methylphenoxy group, a methoxyphenoxy group, or a fluorophenoxy group.

The phosphazene compound means a class of compounds having double bonds and being composed of phosphorous and nitrogen as constituent elements. Of these, the phosphazene compound is preferably a cyclic phosphazene compound, and more preferably a compound represented by formula (3).

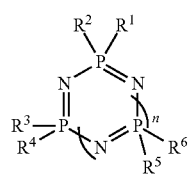

(3)

$R^1$ to $R^6$

In formula (3), $R^1$ to $R^6$ each represent a monovalent substituent. As the monovalent substituent, preferable examples include an alkyl group, an aryl group, an alkoxy group, an aryloxy group; a specific nitrogen-containing group (as described below), such as an amino group; and a halogen atom, such as a fluorine atom, a chlorine atom and a bromine atom. It is preferably that at least one of the substituents represented by $R^1$ to $R^6$ is a fluorine atom. The alkyl group is an alkyl group, which may be substituted, preferably having 1 to 8 carbon atoms, more preferably having 1 to 6 carbon atoms, and further preferably having 1 to 4 carbon atoms. The aryl group is an aryl group, which may be substituted, preferably having 6 to 12 carbon atoms, and more preferably having 6 to 8 carbon atoms. The alkoxy group is an alkoxy group, which may be substituted, preferably having 1 to 8 carbon atoms, more preferably having 1 to 6 carbon atoms, and further preferably having 1 to 4 carbon atoms. The aryloxy group is an aryloxy group, which may be substituted, preferably having 6 to 12 carbon atoms, and more preferably having 6 to 8 carbon atoms. The specific nitrogen-containing group is preferably a specific nitrogen-containing group having 1 to 12 carbon atoms, such as an amino group. The halogen atom is preferably a fluorine atom, or a chlorine atom.

Of these, an alkyl group, an alkoxy group, a specific nitrogen-containing group, a fluorine atom, and a chlorine atom are preferable; and the number of fluorine atoms is more preferably 3 or more.

A group of substituents composed of an alkoxy group, a nitrogen-containing group, and a fluorine atom are more preferable, and a group of substituents composed of a nitrogen-containing group and a fluorine atom are further preferable.

It is preferable that at least one of the substituents represented by $R^1$ to $R^6$ is $-NR^AR^B$, $-N=R^C$, or an azide group, and another at least one is a halogen atom. Particularly, it is preferable that all of $R^1$ to $R^6$ be constituted with a group selected from $-NR^AR^B$, $-N=R^C$, and an azide group or a combination thereof (hereinafter, called as "specific nitrogen-containing group" in some cases), with a halogen atom. As the halogen atom, a fluorine atom is preferable. The number of specific nitrogen-containing groups is not particularly limited, but the number is preferably 1 to 4, more preferably 1 to 3, particularly preferably 1 to 2, and even more preferably 1. Regarding the position of substitution, it is preferable that one phosphorus atom is substituted with a single specific nitrogen-containing group.

Among $R^1$ to $R^6$, substituents adjacent to each other may bind to each other to form a ring containing a phosphorus atom. $R^1$ to $R^6$ may be the same as or different from each other. Particularly, when they form a ring, it is preferable to form a ring by any of $R^1$ and $R^2$, $R^3$ and $R^4$, and $R^5$ and $R^6$.

The substituents $R^1$ to $R^6$ each are preferably an alkyl group, an aryl group, an alkoxy group, an aryloxy group, an alkylthio group, an arylthio group, the specific nitrogen-containing group, or a halogen atom; more preferably an alkyl group having 1 to 6 carbon atoms, an aryl group having 6 to 12 carbon atoms, an alkoxy group having 1 to 6 carbon atoms, an aryloxy group having 6 to 12 carbon atoms, an alkylthio group having 1 to 6 carbon atoms, an arylthio group having 6 to 12 carbon atoms, a halogen atom (preferably a chlorine atom, or a fluorine atom), or the specific nitrogen-containing group; and particularly preferably the specific nitrogen-containing group, a fluorine atom, an alkyl group having 1 to 6 carbon atoms, or an alkoxy group having 1 to 6 carbon atoms. The alkyl group and the aryl group may be substituted. Further, the alkyl group may be linear or branched.

n n represents an integer of 1 or more, preferably an integer of from 1 to 3, more preferably 1 or 2, and further preferably 1.

$R^A$ and $R^B$ $R^A$ and $R^B$ each are a hydrogen atom, an alkyl group, an aryl group, an alkenyl group, an alkynyl group, a heterocyclic group, a cyano group, a silyl group, or a substituent represented by formula (1A), (1B), (1C) or (1D).

(1A)

(1B)

(1C)

(1D)

$R^A$ and $R^B$ each are preferably an alkyl group, an aryl group, or a substituent represented by formula (1A) or (1D); particularly preferably an aryl group having 1 to 6 carbon atoms, a fluorine-substituted alkyl group having 1 to 6 carbon atoms, an ether group-containing alkyl group having 1 to 6 carbon atoms, an aryl group having 6 to 12 carbon atoms, or a substituent having 1 to 7 carbon atoms represented by formula (1A); further preferably an alkyl group having 1 to 4 carbon atoms, or a fluorine-substituted alkyl groups having 1 to 4 carbon atoms. Among these, a substituent having 6 or less carbon atoms in total is preferable, and a substituent having 4 or less carbon atoms in total is particularly preferable. $R^A$ and $R^B$ may be bonded or condensed with each other to form a ring containing a nitrogen atom. The alkyl group may be linear or branched. $R^A$ and $R^B$ may be the same as or different from each other.

$R^{1A1}$, $R^{1C1}$, $R^{1D1}$ and $R^{1D2}$

In the above formulas, $R^{1A1}$, $R^{1C1}$, $R^{1D1}$ and $R^{1D2}$ each represent an alkyl group, an alkoxy group, an aryl group, an aryloxy group, a halogen atom, or an amino group. Preferred examples of the substituent include an alkyl group having 1 to 6 carbon atoms, an alkoxy group having 1 to 6 carbon atoms, an aryl group having 6 to 12 carbon atoms, an aryloxy group having 6 to 12 carbon atoms, a chlorine atom, a fluorine atom, and an amino group having 0 to 6 carbon atoms; and more preferred examples of the substituent include an alkyl group having 1 to 6 carbon atoms, an alkoxy group having 1 to 6 carbon atoms, a chlorine atom, a fluorine atom, and an amino group having 0 to 6 carbon atoms. These substituents may be further substituted. "*" represents a direct bond (bonding hand).

$R^{1B1}$ and $R^{1B2}$ $R^{1B1}$ and $R^{1B2}$ each represent a hydrogen atom, an alkyl group, an aryl group, an alkoxycarbonyl group, an aryloxycarbonyl group, an alkylsulfonyl group, an arylsulfonyl group, a silyl group, or a phosphony group. Preferred examples of the substituent include an alkyl group having 1 to 6 carbon atoms, an alkoxycarbonyl group having 1 to 7 carbon atoms, an aryl group having 6 to 12 carbon atoms, an aryloxycarbonyl group having 7 to 12 carbon atoms, an alkylsulfonyl group having 1 to 6 carbon atoms, an arylsulfonyl group having 6 to 12 carbon atoms, a silyl group having 1 to 6 carbon atoms, and a phosphony group having 1 to 12 carbon atoms; and more preferred examples of the substituent include an alkyl group having 1 to 6 carbon atoms, an alkoxycarbonyl group having 1 to 7 carbon atoms, an alkylsulfonyl group having 1 to 6 carbon atoms, a silyl group having 1 to 6 carbon atoms, and a phosphony group having 1 to 12 carbon atoms.

$X^{A1}$, $X^{D1}$ and $R^{1D3}$

In the above formula, $X^{A1}$ represents an oxygen atom or a sulfur atom.

$X^{D1}$ represents an oxygen atom, a sulfur atom, or a nitrogen atom. When $X^{D1}$ is an oxygen atom or a sulfur atom, $R^{1D3}$ is not a substituent (i.e. $R^{1D3}$ is a hydrogen atom). When $X^{D1}$ is a nitrogen atom, $R^{1D3}$ is preferably an alkyl group (preferably having 1 to 8 carbon atoms), an aryl group (preferably having 6 to 12 carbon atoms), a silyl group (preferably having 1 to 21 carbon atoms), or a phosphony group (preferably having 1 to 18 carbon atoms).

Rc

Rc represents a substituent represented by any one of formulas (C1) to (C6).

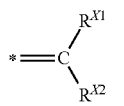 (C1)

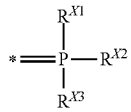 (C2)

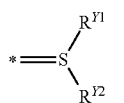 (C3)

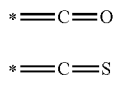 (C4)

 (C5)

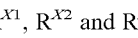 (C6)

$R^{X1}$, $R^{X2}$ and $R^{X3}$ each represent an alkyl group, an aryl group, an alkoxy group, an aryloxy group, an alkylthio group, an arylthio group, a heterocyclic group, a halogen atom, or a silyl group; and preferably an alkyl group having 1 to 6 carbon atoms, an alkoxy group having 1 to 6 carbon atoms, an alkylthio group (preferably having 1 to 6 carbon atoms), a chlorine atom, a fluorine atom, or a silyl group (preferably having 1 to 15 carbon atoms). $R^{Y1}$ and $R^{Y2}$ each represent a halogen atom.

The kind and the number of substituents $R^1$ to $R^6$ are not particularly limited. In view of securing flame retardancy while maintaining battery performance, it is preferable that two or more among all of the substituents be fluorine atoms and the remaining substituents be the specific nitrogen-containing group or alkoxy groups. It is more preferable that three or more among all of the substituents be fluorine atoms. It is most preferable that four or more of the substituents be fluorine atoms. Alternatively, from the same point of view as described above, it is preferable that all of $R^1$ to $R^6$ are constituted with halogen atoms (preferably a fluorine atom) and the specific nitrogen-containing group. Particularly, it is preferable that one to three among the substituents be the specific nitrogen-containing groups. It is more preferable that one or two among the substituents be the specific, nitrogen-containing group. It is even more preferable that one of the substituents be the specific nitrogen-containing group.

The compound represented by formula (3) is preferably a compound represented by formula (3A) or (3B).

 (3A)

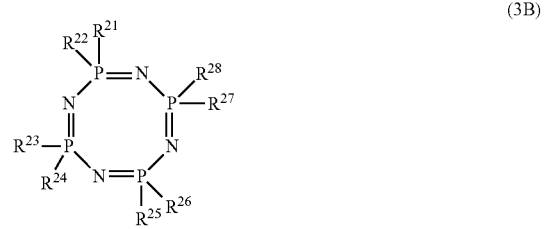 (3B)

$R^{21}$ to $R^{28}$

In formulas (3A) and (3B), $R^{21}$ to $R^{28}$ have the same meanings as $R^1$ to $R^6$ in formula (1). Of these, a halogen atom, an alkyl group, an aryl group, an alkoxy group, an aryloxy group, an alkylthio group, an arylthio group, and the specific nitrogen-containing group are preferable; an alkyl group having 1 to 6 carbon atoms, an aryl group having 6 to 12 carbon atoms, an alkoxy group having 1 to 6 carbon atoms, an aryloxy group having 6 to 12 carbon atoms, an alkylthio group having 1 to 6 carbon atoms, an arylthio group having 6 to 12 carbon atoms, a halogen atom (preferably a chlorine atom, or a fluorine atom), and the specific nitrogen-containing group are more preferable; and the specific nitrogen-containing group, a fluorine atom, an alkyl group having 1 to 6 carbon atoms, and an alkoxy group having 1 to 6 carbon atoms are particularly preferable. The alkyl group and the aryl group may be substituted. Further, the alkyl group may be linear or branched. It is preferable that at least one of $R^{21}$ to $R^{28}$ is the aforementioned —$NR^AR^B$, —N=$R^C$ or an azide group or a combination thereof (the specific nitrogen-containing group), and another at least one of the remaining $R^{21}$ to $R^{28}$ is a fluorine atom. It is more preferable for the substituents to be in the form of a compound formed of the specific nitrogen-containing group and fluorine atoms. The number of specific nitrogen-containing groups is 1 to 4, preferably 1 to 3, particularly preferably 1 to 2, and even more preferably 1. It is preferable for the substituents to be constituted only with fluorine atoms, in addition to the specific nitrogen-containing group(s).

Specific Nitrogen-Containing Group

The groups preferable as the specific nitrogen-containing group, the number and substitution position thereof, the relationship between the specific nitrogen-containing group and halogen atoms, a preferable range thereof, and the like, are the same as those described for formula (3). Specifically, the kind and the number of $R^{21}$ to $R^{28}$ are not particularly limited. However, in view of securing flame retardancy while maintaining battery performance, it is preferable that two or more among all of the substituents be fluorine atoms and the remaining substituents consist of the specific nitrogen-containing group and alkoxy groups. It is more preferable that three or more among all of the substituents be fluorine atoms. It is most preferable that four or more, more favorably, five or more among the substituents be fluorine atoms. Alternatively, from the same point of view as described above, it is preferable for all of $R^{21}$ to $R^{28}$ to be constituted with halogen atoms (preferably, a fluorine atom) and the specific nitrogen-containing group. The number of specific nitrogen-containing groups constituting the substituents is preferably 1 to 3, more preferably 1 or 2, and even more preferably 1.

Hereinafter, specific examples of the compound represented by formula (3) will be shown, but the present invention is not limited to those.

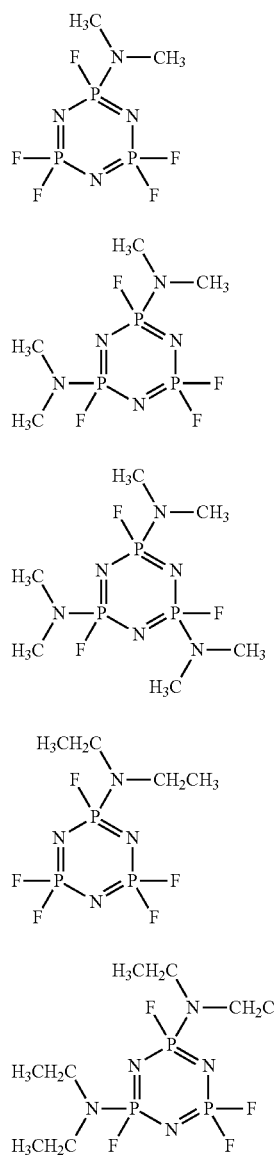

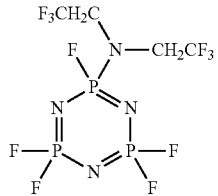

(1-6)

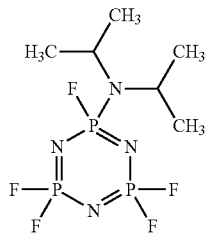

(1-7)

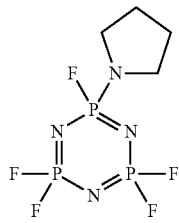

(1-8)

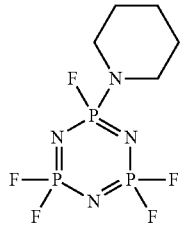

(1-9)

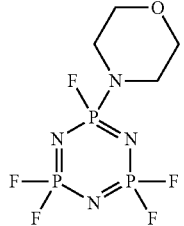

(1-10)

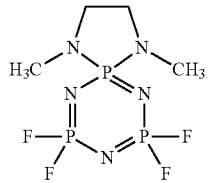

(1-11)

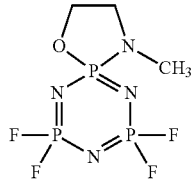

(1-12)

-continued
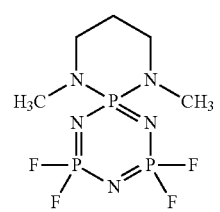
(1-13)
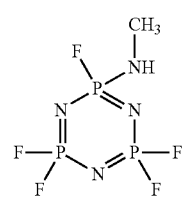
(1-14)
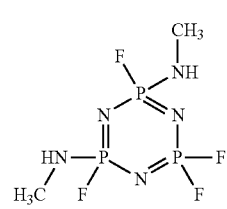
(1-15)
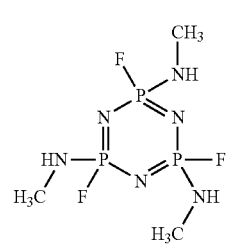
(1-16)
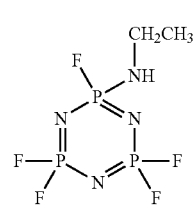
(1-17)
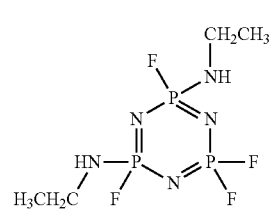
(1-18)
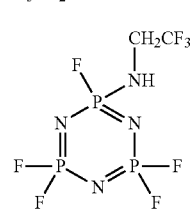
(1-19)
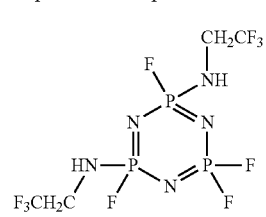
(1-20)
-continued
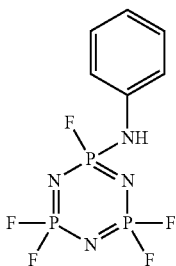
(1-21)
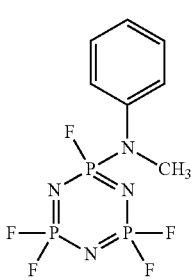
(1-22)
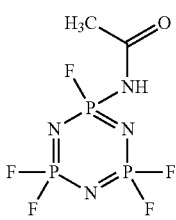
(1-23)
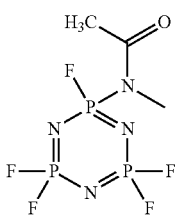
(1-24)
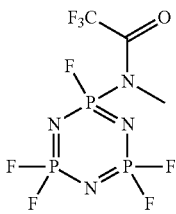
(1-25)
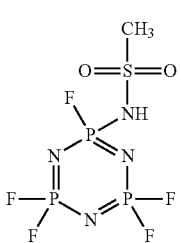
(1-26)

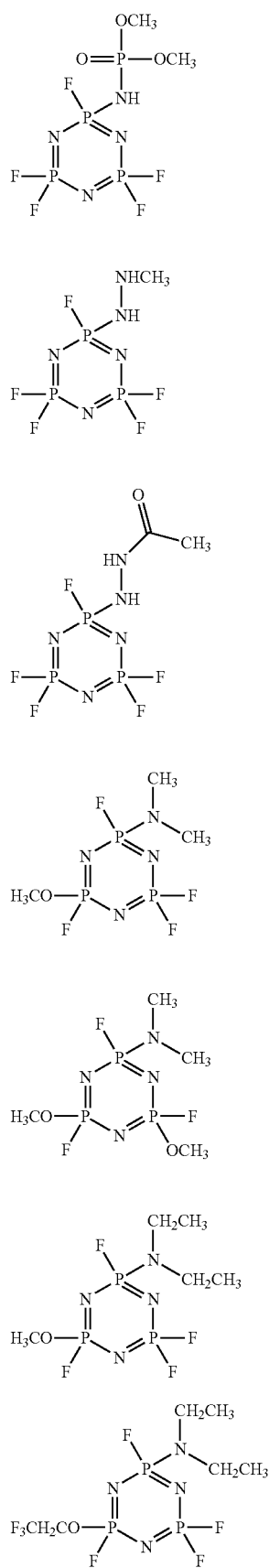

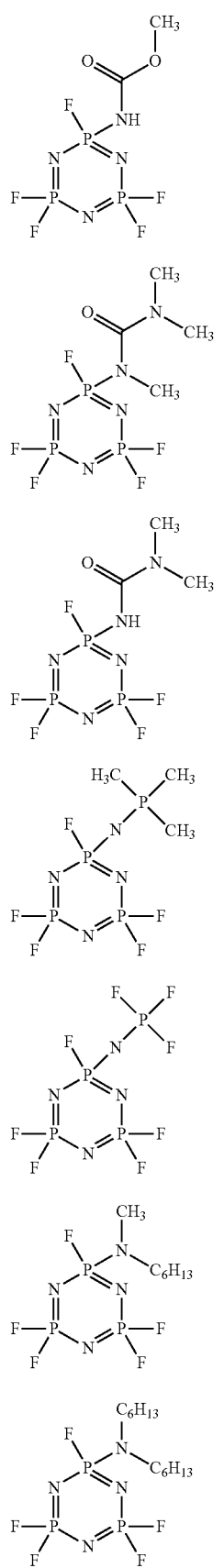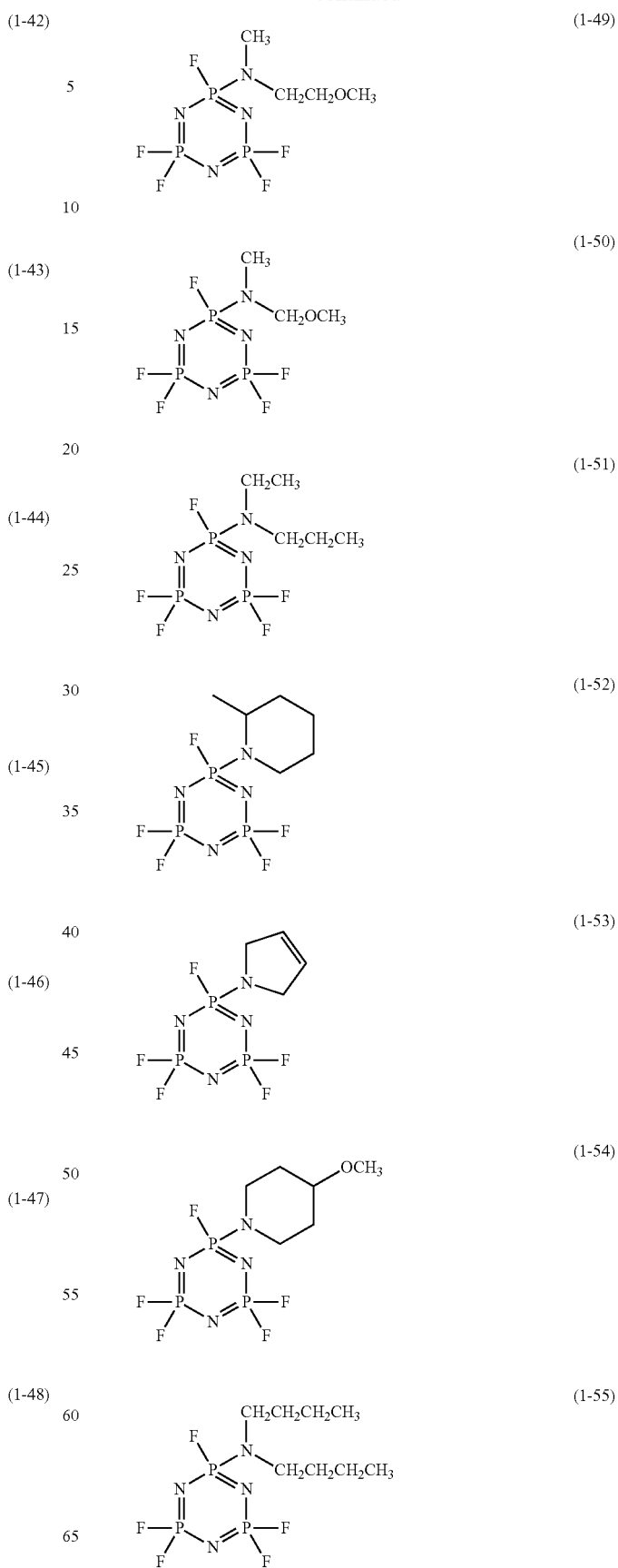

(1-56) 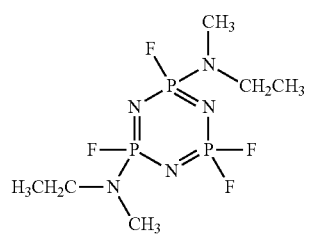
(1-57) 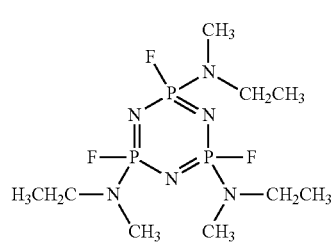
(1-58) 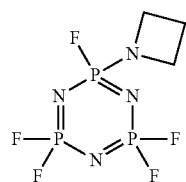
(1-59) 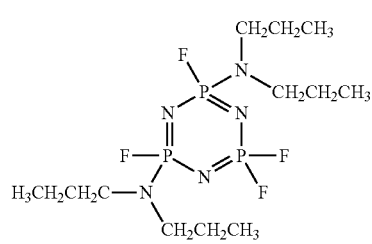
(1-60) 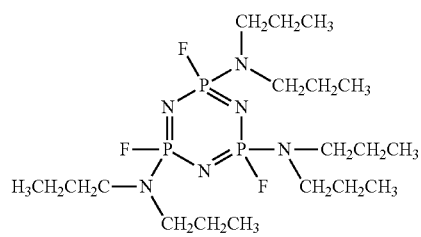
(1-61) 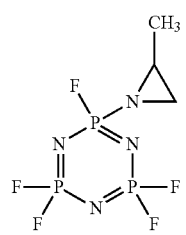
(1-62) 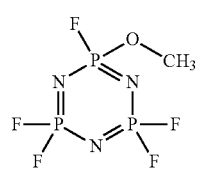
(1-63) 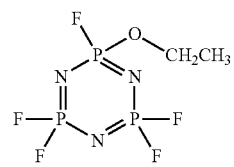
(1-64) 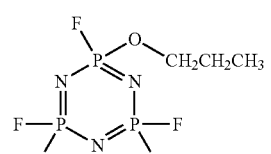
(1-65) 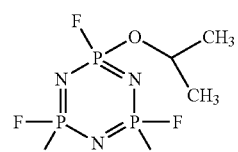
(1-66) 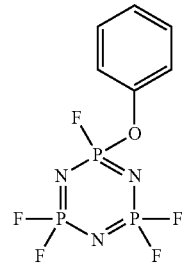
(1-67) 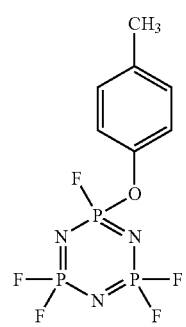
(1-68) 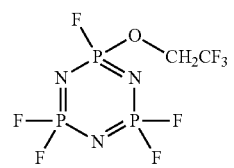
(1-69) 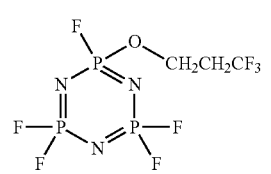
(1-70) 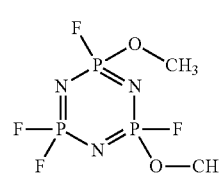

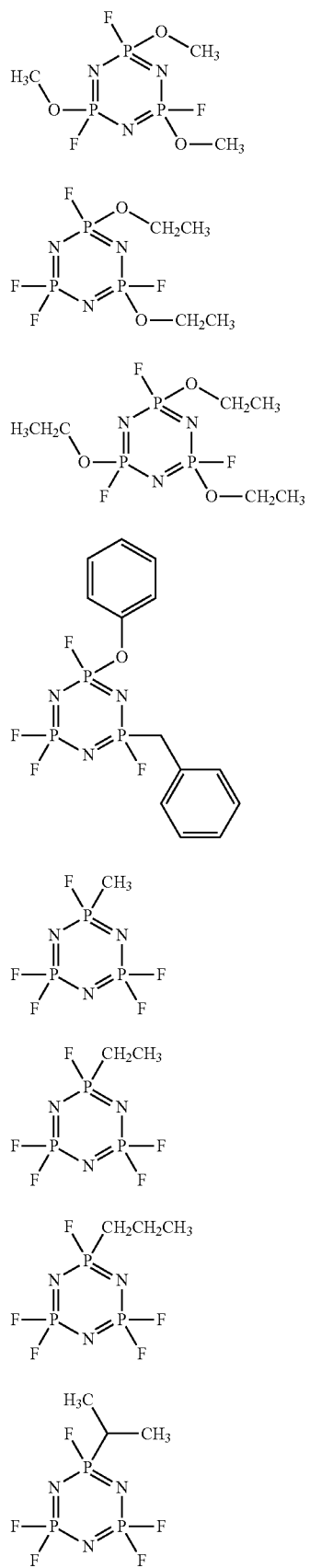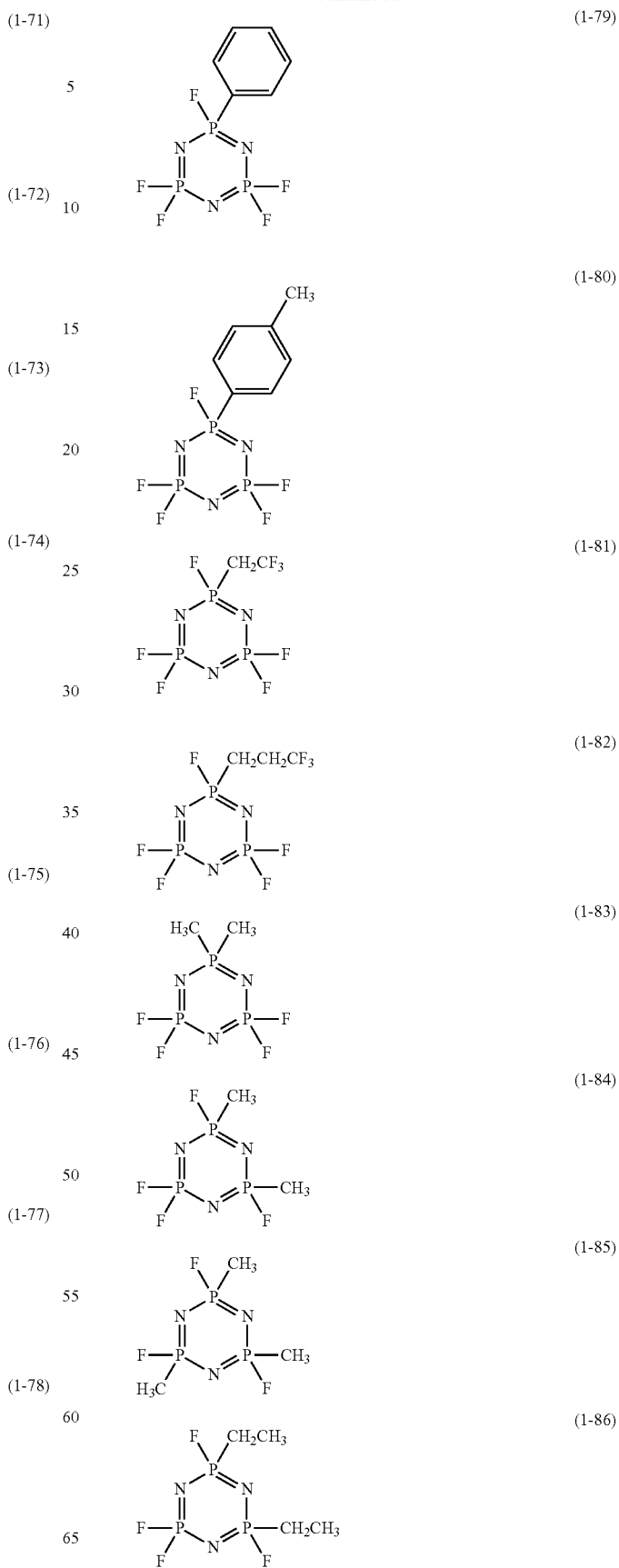

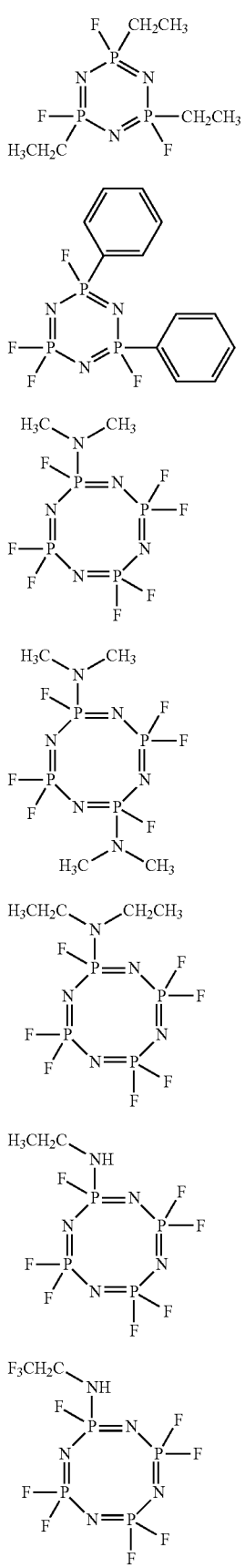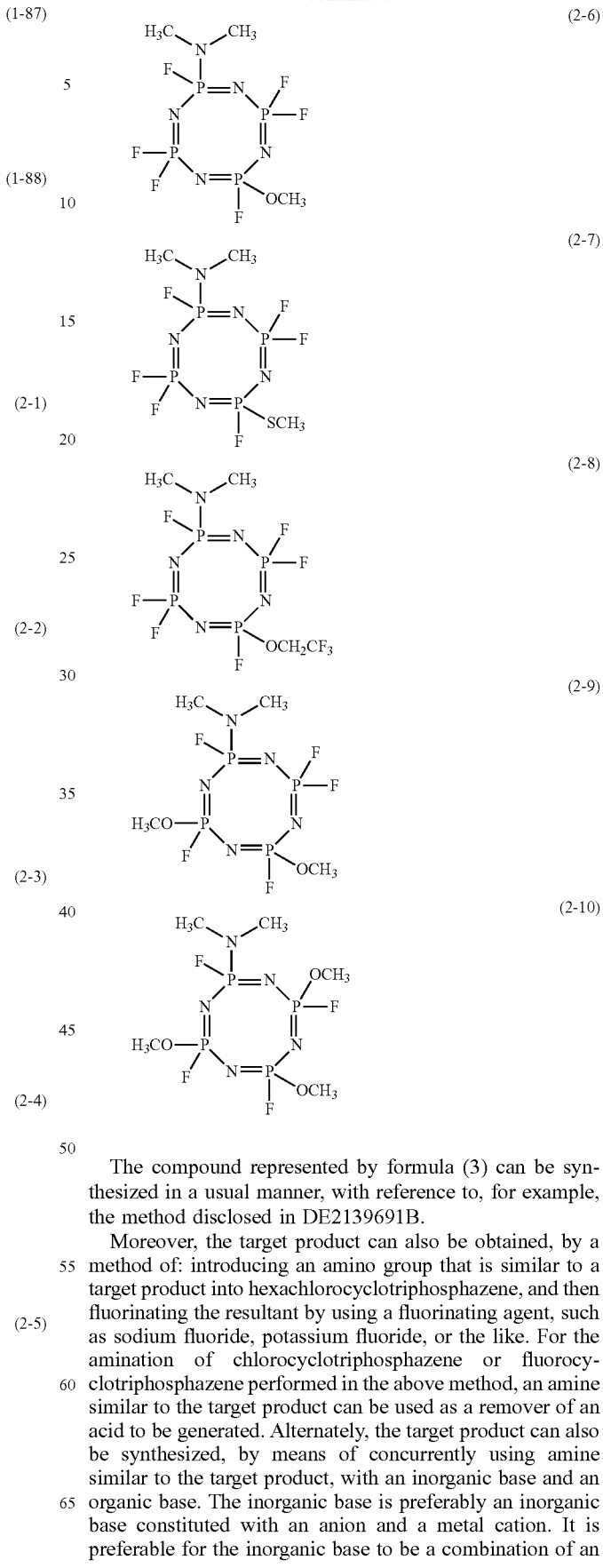

The compound represented by formula (3) can be synthesized in a usual manner, with reference to, for example, the method disclosed in DE2139691B.

Moreover, the target product can also be obtained, by a method of: introducing an amino group that is similar to a target product into hexachlorocyclotriphosphazene, and then fluorinating the resultant by using a fluorinating agent, such as sodium fluoride, potassium fluoride, or the like. For the amination of chlorocyclotriphosphazene or fluorocyclotriphosphazene performed in the above method, an amine similar to the target product can be used as a remover of an acid to be generated. Alternately, the target product can also be synthesized, by means of concurrently using amine similar to the target product, with an inorganic base and an organic base. The inorganic base is preferably an inorganic base constituted with an anion and a metal cation. It is preferable for the inorganic base to be a combination of an anion, which is selected from hydroxides, carbonates, bicarbonates, and fluorides, with a metal cation which is selected from alkali metals and alkaline earth metals. It is preferable for the metal cation to be selected from sodium, potassium, magnesium, and calcium. Preferable examples thereof specifically include: hydroxides, such as sodium hydroxide and potassium hydroxide; carbonates, such as potassium carbonate, sodium carbonate, and sodium hydrogen carbonate; and fluorides, such as sodium fluoride and potassium fluoride. Examples of the organic base include: trialkylamine, such as triethylamine, diisopropylethyamine, methylmorpholine, and diazabicycloundecene; and aromatic bases, such as pyridine and lutidine. As the solvent to be used in that synthesis, solvents that are generally used can be used without problems, but preferable examples thereof include ester-based solvents, ether-based solvents, nitrile-based solvents, and aliphatic-based solvents. Specific preferred examples thereof include: ester-based solvents, such as ethyl acetate, and butyl acetate; ether-based solvents, such as diethyl ether, tert-butyl methyl ether, and cyclopentyl methyl ether; nitrile-based solvents, such as acetonitrile; and aliphatic-based solvents, such as hexane, and decane. Among these, ether-based solvents and nitrile-based solvents are preferable.

In the liquid electrolyte of the present invention, the content of the flame retardant is not particularly limited, but preferably from 0.01 to 5 mol/L, more preferably from 0.02 to 1 mol/L, and particularly preferably from 0.05 to 0.5 mol/L. In terms of mass standard, the content is preferably 0.1% by mass or more, more preferably 1% by mass or more, and particularly preferably 2% by mass or more. The upper limit is preferably 50% by mass or less, more preferably 30% by mass or less, and particularly preferably 20% by mass or less. By using the flame retardant in such a range, combination effects (interaction) with the particular nitrile compound described below are preferably obtained, so that a good balance between flame retardancy and battery properties, such as cycling characteristics and the like, can be achieved at a very high level.

The compound which acts as the flame retardant has a polar group, such as P=O, P=N, and P—X (X represents a halogen), and this is understood to act with the nitrile compound described below, to exert desired effects. Regarding this action, much the same is true on the organic solvent described below, and use of a compound having a polar group can be expected to have the similar effects.

[Particular Nitrile Compound]

In the liquid electrolyte of the present invention, the nitrile compound represented by formula (1) is contained.

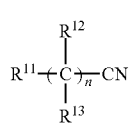

(1)

R$^{11}$ to R$^{13}$

In formula (1), R$^{11}$ to R$^{13}$ each independently represent a hydrogen atom, an alkyl group, an alkoxycarbonyl group, an aryloxycarbonyl group, a cyano group, a carbamoyl group, a sulfonyl group, or a phosphony group. Preferred examples of each substituent include those exemplified as the substituent T described below. Among these, any one or more of R$^{11}$ to R$^{13}$ preferably contains a cyano group, and other group(s) thereof is preferably a hydrogen atom, a methyl group, an ethyl group, a propyl group, an isopropyl group, or the like.

n n represents an integer of from 1 to 8.

The nitrile compound represented by formula (1) is preferably a compound represented by formula (1a).

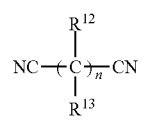

(1a)

R$^{12}$ and R$^{13}$ have the same meaning as those in formula (1). R$^{12}$ and R$^{13}$ each are preferably a hydrogen atom, or an alkyl group (preferably having 1 to 6 carbon atoms, more preferably having 1 to 3 carbon atoms). n is an integer of from 1 to 8, preferably an integer of from 1 to 6.

Preferred specific examples of the nitrile compound represented by formula (1) include acetonitrile, propionitrile, isobutyronitrile, succinonitrile, malononitrile, glutaronitrile, adiponitrile, 2-methylglutaronitrile, hexanetricarbonitrile, and propanetetracarbonitrile; and particularly preferred examples thereof include succinonitrile, malononitrile, glutaronitrile, adiponitrile, 2-methylglutaronitrile, hexanetricarbonitrile, and propanetetracarbonitrile.

In the present invention, the blend amount of the particular nitrile compound is important, and the nitrile compound is contained in an amount of 0.1 parts by mass or more, preferably 0.5 parts by mass or more, and particularly preferably 1 part by mass or more, with respect to 100 parts by mass of the flame retardant. The upper limit is not particularly restricted, but the particular nitrile compound is contained in an amount of 10 parts by mass or less, preferably 7 parts by mass or less, and particularly preferably parts by 5 mass or less, to 100 parts by mass of the flame retardant. By blending the particular nitrile compound in such a range, good combination effects (interaction) together with the flame retardant can be obtained, whereby a good balance between high-flame retardancy and high-cycling characteristics can be achieved effectively.

[Aprotic Solvent]

The non-aqueous liquid electrolyte of the present invention contains an aprotic solvent, and the aprotic solvent preferably contains a compound represented by any one of formulas (4A), (4B) or (4C), or a combination thereof

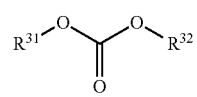

(4A)

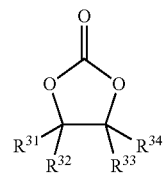

(4B)

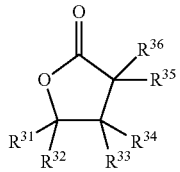

(4C)

$R^{31}$ to $R^{36}$

In formulas (4A) to (4C), $R^{31}$ to $R^{36}$ each represent a hydrogen atom, an alkyl group that may be substituted with fluorine in some cases, an alkyl group having an ether chain, or an aryl group that may be substituted with fluorine in some cases. As the alkyl group and the aryl group, a linear or branched alkyl group, an alkyl group having a fluorine atom, and an alkyl group having an ether chain are preferable. Among these, an alkyl group having 1 to 6 carbon atoms, an alkyl groups having 1 to 6 carbon atoms that is partially substituted with fluorine, and an alkyl group having 1 to 6 carbon atoms and including an ether group are particularly preferable. Further, as described above, the substituents adjacent to each other may form a ring. Particularly, the substituents $R^{31}$ and $R^{32}$ as well as $R^{33}$ and $R^{34}$ in formula (4B) may form a ring. In addition, the substituents $R^{31}$ and $R^{32}$, $R^{33}$ and $R^{34}$, and $R^{35}$ and $R^{36}$ in formula (4C) may form a ring.

When the aprotic solvent contains the compound represented by formula (4A), and at least one selected from the group consisting of the compound represented by formula (4B) and the compound represented by formula (4C), a ratio ($M_{4B}/M_{AC}$) between a volume ($M_{4B}$) of the compound represented by formula (4B) and a total volume ($M_{AC}$) of the compound represented by formula (4A) and the compound represented by formula (4C) is preferably from 0.2 to 5 and more preferably from 0.3 to 1. When the ratio is set to be equal to or lower than the upper limit described above, it is possible to prevent conspicuously large increase in viscosity, at a sufficient dielectric constant, and to maintain favorable cycling characteristics, without excessively lowering lithium ion conductivity. On the other hand, when the ratio is set to be equal to or higher than the lower limit described above, it is possible to realize favorable cycling characteristics, without excessively lowering dielectric constant.

It is noted that in the present specification, the representation of the compound is used in the sense that not only the compound itself, but also its salt, and its ion are included to mean. Further, it is used in the sense that the compound means to include a derivative thereof which is modified in a predetermined part in the range of achieving desired effects.

Further, in the present specification, a substituent (and also the same is applied to a linking group) that is not specified by substitution or non-substitution means that the substituent may have an optional substituent. This is also applied, in the same meaning, to the compound that is not specified by substitution or non-substitution. Preferable examples of the substituent include the substituent T described below.

Examples of the substituent T include: an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, more preferably a 5- or 6-membered heterocyclic group having at least one oxygen atom, sulfur atom or nitrogen atom, e.g. 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxyphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group, an alkylamino group and an arylamino group, each having 0 to 20 carbon atoms, e.g. amino, N,N-dimethylamino, N,N-diethylamino, N-ethylamino, or anilino), a sulfamoyl group (preferably a sulfamoyl group having 0 to 20 carbon atoms, e.g. N,N-dimethylsulfamoyl, or N-phenylsulfamoyl), an acyl group (preferably an acyl group having 1 to 20 carbon atoms, e.g. acetyl, propionyl, butyryl, or benzoyl), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, or N-phenylcarbamoyl), an acylamino group (preferably an acylamino group having 1 to 20 carbon atoms, e.g. acetylamino, or benzoylamino), a sulfonamide group (preferably a sulfonamide group having 0 to 20 carbon atoms, e.g. methane sulfonamide, benzene sulfonamide, N-methyl methane sulfonamide, or N-ethyl benzene sulfonamide), an alkylthio group (preferably an alkylthio group having 1 to 20 carbon atoms, e.g. methylthio, ethylthio, isopropylthio, or benzylthio), an arylthio group (preferably an arylthio group having 6 to 26 carbon atoms, e.g. phenylthio, 1-naphthylthio, 3-methylphenylthio, or 4-methoxyphenylthio), an alkyl- or aryl-sulfonyl group (preferably an alkyl- or aryl-sulfonyl group having 1 to 20 carbon atoms, e.g. methylsulfonyl, ethylsulfonyl, or benzene sulfonyl), a hydroxyl group, a cyano group, and a halogen atom (e.g. a fluorine atom, a chlorine atom, a bromine atom, or an iodine atom). Among these, more preferable are an alkyl group, an alkenyl group, an aryl group, a heterocyclic group, an alkoxy group, an aryloxy group, an alkoxycarbonyl group, an amino group, an acylamino group, a hydroxyl group, and a halogen atom; and particularly preferable are an alkyl group, an alkenyl group, a heterocyclic group, an alkoxy group, an alkoxycarbonyl group, an amino group, an acylamino group, and a hydroxyl group.

Moreover, each group exemplified as the substituent T may be further substituted with the substituent T.

When a compound, a substituent, a linking group, or the like contains an alkyl group, an alkylene group, an alkenyl group, an alkenylene group, or the like, these groups may be a cyclic group or a chain group, may be linear or branched, and may be substituted or unsubstituted as described above. Furthermore, when the compound, the substituent, the linking group, or the like contains an aryl group, a heterocyclic group, or the like, they may be monocyclic or fused-cyclic, and may be substituted or unsubstituted as described above.

(Electrolyte)

Electrolyte that can be used in the liquid electrolyte of the present invention includes a metal ion or a salt thereof, and a metal ion belong to Group I or Group II of the Periodic Table or a salt thereof are preferable. Specifically, the electrolyte is suitably selected depending on the purpose of the liquid electrolyte. For example, lithium salts, potassium salts, sodium salts, calcium salts, and magnesium salts can be mentioned. Of these, from the viewpoint of the output power of the secondary battery, a lithium salt is preferred. In a case of using the liquid electrolyte of the present invention as the electrolyte of a non-aqueous liquid electrolyte for lithium secondary batteries, it is desirable to select a lithium salt as the salt of the metal ion. The lithium salt is not particularly limited as long as it is a lithium salt that is usually used in the electrolyte of a non-aqueous liquid electrolyte for lithium secondary batteries, but for example, the salts described below are preferred.

(L-1) Inorganic lithium salts: inorganic fluoride salts, such as $LiPF_6$, $LiBF_4$, $LiAsF_6$, $LiSbF_6$; perhalogenic acid salts, such as $LiClO_4$, $LiBrO_4$, $LiIO_4$; and inorganic chloride salts, such as $LiAlCl_4$, and the like.

(L-2) Fluorine-containing organo-lithium salts: perfluoroalkanesulfonic acid salts, such as $LiCF_3SO_3$; perfluoroalkanesulfonylimide salts, such as $LiN(CF_3SO_2)_2$, $LiN(CF_3CF_2SO_2)_2$, $LiN(FSO_2)_2$, and $LiN(CF_3SO_2)(C_4F_9SO_2)$; perfluoroalkanesulfonylmethide salts, such as $LiC(CF_3SO_2)_3$; fluoroalkyl fluorophosphoric acid salts, such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$, and the like.

(L-3) Oxalatoborate salts: lithium bis(oxalate)borate, lithium difluoro(oxalate)borate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$, are preferred; and lithium imide salts, such as $LiPF_6$, $LiBF_4$, $LiN(Rf^1SO_2)_2$, $LiN(FSO_2)_2$ and $LiN(Rf^1SO_2)(Rf^2SO_2)$ are more preferred. Herein, $Rf^1$ and $Rf^2$ each represent a perfluoroalkyl group.

As for the lithium salt that is used in the liquid electrolyte, one kind may be used alone, or any two or more kinds may be used in combination.

The electrolyte is added to the liquid electrolyte in such an amount that the electrolyte is contained at a preferred salt concentration to be mentioned in the method of preparing the liquid electrolyte below. The salt concentration is selected according to the purpose of the liquid electrolyte, but the content is usually from 10 mass % to 50 mass %, and more preferably from 15 mass % to 30 mass %, to the total mass of the liquid electrolyte. When evaluated as the ionic concentration, the salt concentration need only be calculated in terms of the salt with an advantageously applied metal.

(Other Components)

The liquid electrolyte of the present invention may contain at least one selected from the group consisting of a forming agent of a film on a negative electrode, a flame retardant, and an overcharge preventing agent. The content ratio of these functional additives in the non-aqueous liquid electrolyte is not particularly limited, but is each preferably 0.001% by mass to 10% by mass, with respect to the whole non-aqueous liquid electrolyte.

[Method of Preparing the Liquid Electrolyte, and the Like]

The non-aqueous liquid electrolyte of the present invention for a secondary battery is prepared by a usual method in such a manner that the above-mentioned each component is dissolved in the non-aqueous liquid electrolyte solvent including an example using a lithium salt as a salt of metal ion.

The term "non-aqueous" as used in the present invention means that water is substantially not contained, and a small amount of water may be contained as long as the effects of the present invention are not impaired. In consideration of obtaining good properties, water is preferably contained in an amount of up to 200 ppm (mass standard) and more preferably up to 100 ppm. Although the lower limit is not particularly restricted, it is practical for the water content to be 10 ppm or more in consideration of inevitable incorporation. Although the viscosity of the liquid electrolyte of the present invention is not particularly limited, the viscosity at 25° C. is preferably 10 to 0.1 mPa·s, more preferably 5 to 0.5 mPa·s.

<Measuring Method of Viscosity>

The viscosity is defined as a value measured by the following method. One milliliter of a sample solution is measured by means of a rheometer (CLS 500) with 4-cm/2° Steel Cone (both manufactured by TA Instruments Co.). The measurement is started after previously keeping the sample solution at a measurement initiating temperature until the liquid temperature becomes constant. The measuring temperature is set to 25° C.

(Kit)

The liquid electrolyte of the present invention may be formed from a kit composed of a plurality of liquids, powders, or the like. For example, the liquid electrolyte may be in a form that a first agent (first liquid) is composed of an electrolyte and an organic solvent (i.e. an aprotic solvent), a second agent (second liquid) is composed of the flame retardant and/or the nitrile compound, and an organic solvent (i.e. an aprotic solvent), and the two liquids are mixed to prepare a liquid before use. In the kit of the present invention, the flame retardant and the nitrile compound may be separated from one another as a different agent. Further, other additives may be preliminarily contained in the above-described first agent, second agent, and/or another agent (third agent).

[Secondary Battery]

In the present invention, a non-aqueous liquid electrolyte secondary battery preferably contains the non-aqueous liquid electrolyte. A preferable embodiment is described while referring to FIG. 1 schematically illustrating a mechanism of a lithium secondary battery. Herein, the scope of the present invention is not construed by being limited by FIG. 1 and the description thereof.

The lithium secondary battery 10 of the present embodiment includes the above-described non-aqueous liquid electrolyte 5 of the present invention, a positive electrode C (current collector for positive electrode 1, positive electrode active material layer 2) capable of insertion and release of lithium ions, and a negative electrode A (current collector for negative electrode 3, negative electrode active material layer 4) capable of insertion and discharge, or dissolution and precipitation, of lithium ions. In addition to these essential members, the lithium secondary battery may also be constructed to include a separator 9 that is disposed between the positive electrode and the negative electrode, current collector terminals (not shown), and an external case (not shown), in consideration of the purpose of using the battery, the form of the electric potential, and the like. According to the necessity, a protective element may also be mounted in at least any one side of the interior of the battery and the exterior of the battery. By employing such a structure, transfer of lithium ions a and b occurs in the liquid electrolyte 5, and charging α and discharging β can be carried out. Thus, operation and accumulation can be carried out by means of an operating means 6 through the circuit wiring 7.

(Battery Shape)

There are no particular limitations on the battery shape that is applied to the lithium secondary battery of the present embodiment, and examples of the shape include a bottomed cylindrical shape, a bottomed rectangular shape, a thin flat shape, a sheet shape, and a paper shape. The lithium secondary battery of the present embodiment may have any of these shapes. Furthermore, an atypical shape, such as a horseshoe shape or a comb shape, which is designed in consideration of the form of the system or device into which the lithium secondary battery is incorporated, may also be used. Among them, from the viewpoint of efficiently releasing the heat inside of the battery to the outside thereof, a rectangular shape, such as a bottomed rectangular shape or a thin flat shape, which has at least one relatively flat and large-sized surface, is preferred.

In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. The secondary battery having the bottomed cylindrical shape will be described in below together with FIG. 2.

(Battery-Constituting Members)

The lithium secondary battery of the present embodiment is constituted to include the liquid electrolyte 5, an electrode mixture of a positive electrode C, an electrode mixture of a negative electrode A, and basic member of the separator 9, based on FIG. 1. These various members will be described below.

(Electrode Mixtures)

An electrode mixture is a sheet-like substance obtained by applying a dispersion of an active material, an electroconductive agent, a binder, a filler and the like on a current collector (electrode substrate). For a lithium battery, use is usually made of: a positive electrode mixture in which the active material is a positive electrode active material; and a negative electrode mixture in which the active material is a negative electrode active material. Next, each component in dispersions composing the electrode mixture (mixture, composition for electrode) is described.

Positive Electrode Active Material

In the present invention, a material having a charge range of 4.25V or more is preferably used as a positive electrode active material. Specifically, a lithium-containing transition metal oxide having a lithium-insertion/release potential peak at 4.25 V or more to lithium is preferable. The insertion/release potential peak at this time can be identified by preparing a thin-film electrode of a positive electrode active material in accordance with a Sol-Gel method or a sputtering method and then conducting an electrochemical measurement (cyclic voltammetry).

Examples of the positive electrode active material which has the above-described particular charge range includes the following materials.

(i) $LiNi_xMn_yCo_zO_2$ (x>0.2, y>0.2, z≥0, x+y+z=1),
Representative Examples:
$LiNi_{1/3}Mn_{1/3}Co_{1/3}O_2$ (also described as $LiNi_{0.33}Mn_{0.33}Co_{0.33}O_2$)
$LiNi_{1/2}Mn_{1/2}O_2$ (also described as $LiNi_{0.5}Mn_{0.5}Co_{0.5}O_2$)
(ii) $LiNi_xMn_yO_4$ (x>0.2, y>0.7, x+y=1)
Representative Examples:
$LiNi_{1/4}Mn_{3/4}O_2$ (also described as $Li_2Ni_{0.5}Mn_{1.5}O_4$)
(iii) $LiNi_xCo_yAl_zO_2$ (x>0.7, y>0.1, 0.1>z≥0.05, x+y+z=1)
Representative Examples:
$LiNi_{0.8}Co_{0.15}Al_{0.05}O_2$ As for the positive electrode active material which has the above-described particular charge range, the following materials also can be used.
(a) $LiCoMnO_4$
(b) $Li_2FeMn_3O_8$
(c) $Li_2CuMn_3O_8$
(d) $Li_2CrMn_3O_8$
(e) $Li_2NiMn_3O_8$ In the non-aqueous liquid electrolyte secondary battery of the present invention, the positive electrode active material may be used in the form of particles. The average particle size of the positive electrode active material to be used is not particularly limited, but the average particle size is preferably from 0.1 μm to 50 μm. The specific surface area is not particularly limited, but specific surface area as measured by the BET method is preferably from 0.01 m$^2$/g to 50 m$^2$/g. Furthermore, the pH of the supernatant obtainable when 5 g of the positive electrode active material is dissolved in 100 mL of distilled water is preferably from 7 to 12.

In order to adjust the positive electrode active material to a predetermined particle size, an ordinary pulverizer or classifier can be used. For example, a mortar, a ball mill, a vibrating ball mill, a vibrating mill, a satellite ball mill, a planetary ball mill, a swirling air flow jet mill, or a sieve is used. The positive electrode active material obtained according to the calcination method may be used after washing the active material with water, an acidic aqueous solution, an alkaline aqueous solution, or an organic solvent.

The amount of the positive-electrode active material to be mixed in is not particularly limited, but the amount is preferably 60% by mass to 98% by mass, and more preferably 70% by mass to 95% by mass, provided that the amount of solid content in the dispersion (mixture) forming the electrode mixture is 100% by mass.

Negative Electrode Active Material

There are no particular limitations on the negative electrode active material, as long as the negative electrode active material is preferably capable of reversible insertion and release of lithium ions, and examples thereof include: carbonaceous materials; metal oxides, such as tin oxide, and silicon oxide; metal composite oxides; simple lithium substance; lithium alloys, such as a lithium-aluminum alloy; and metals capable of forming an alloy with lithium, such as Sn and Si.

For these materials, one kind may be used alone, or two or more kinds may be used in any combination at any proportions. Among them, carbonaceous materials or lithium composite oxides are preferably used from the viewpoint of safety.

Furthermore, the metal composite oxides are not particularly limited as long as the materials are capable of adsorption and release of lithium, but it is preferable for the composite oxides to contain titanium and/or lithium as constituent components, from the viewpoint of high current density charging-discharging characteristics.

A carbonaceous material that is used as a negative electrode active material is a material which is substantially composed of carbon. Examples thereof include: petroleum pitch; natural graphite; artificial graphite, such as vapor-grown graphite; and carbonaceous materials obtained by firing various synthetic resins, e.g. PAN-based resins and furfuryl alcohol resins. Further, the examples may further include: various carbon fibers, such as PAN-based carbon fibers, cellulose-based carbon fibers, pitch-based carbon fibers, vapor-grown carbon fibers, dehydrated PVA-based carbon fibers, lignin carbon fibers, vitreous carbon fibers, and activated carbon fibers; mesophase microspheres; graphite whiskers; and tabular graphite.

These carbonaceous materials may be classified into hardly graphitized carbon materials and graphite-based carbon materials, according to the degree of graphitization. Also, it is preferable that the carbonaceous materials have the plane spacing, density, and size of crystallites, as described in JP-A-62-22066, JP-A-2-6856, and JP-A-3-45473. The carbonaceous materials are not necessarily single materials, and a mixture of natural graphite and an artificial graphite, as described in JP-A-5-90844, a graphite having a coating layer, as described in JP-A-6-4516, and the like can also be used.

In regard to the metal oxides and metal composite oxides, each of which are negative electrode active materials that can be used in the non-aqueous liquid electrolyte secondary battery, at least one of these may be contained. The metal oxides and metal composite oxides are particularly preferably amorphous oxides, and furthermore, chalcogenides which are reaction products of metal elements and the elements of Group 16 of the Periodic Table of Elements are also preferably used. The term amorphous as used herein means that the substance has a broad scattering band having an apex at a 2θ value in the range of 20° to 40°, as measured by an X-ray diffraction method using CuKα radiation, and the substance may also have crystalline diffraction lines. The highest intensity obtainable among the crystalline diffraction lines exhibited at a 2θ value in the range of from 40° to 70° is preferably 100 times or less, and more preferably 5 times or less, than the diffraction line intensity of the apex of the broad scattering band exhibited at a 2θ value in the range of from 20° to 40°, and it is particularly preferable that the substance does not have any crystalline diffraction line.

Among the group of compounds composed of the amorphous oxides and chalcogenides, chalcogenides and amorphous oxides of semi-metallic elements are more preferred, and oxides and chalcogenides formed from one kind alone or combinations of two or more kinds of the elements of Group 13 (IIIB) to Group 15 (VB) of the Periodic Table of Elements, Al, Ga, Si, Sn, Ge, Pb, Sb and Bi are particularly preferred. Specific preferred examples of the amorphous oxides and chalcogenides include, for example, $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. Furthermore, these may also be composite oxides with lithium oxide, for example, $Li_2SnO_2$.

The average particle size of the negative electrode active material used in the non-aqueous liquid electrolyte secondary battery is preferably from 0.1 μm to 60 μm. In order to adjust the negative electrode active material to a predetermined particle size, a well-known pulverizer or classifier may be used. For example, a mortar, a ball mill, a sand mill, a vibrating ball mill, a satellite ball mill, a planetary ball mill, a swirling air flow jet mill, and a sieve are favorably used. At the time of pulverization, wet pulverization of using water or an organic solvent, such as methanol. to co-exist with the negative electrode active material can also be carried out as necessary. In order to obtain a desired particle size, it is preferable to perform classification. There are no particular limitations on the classification method, and a sieve, an air classifier or the like can be used as necessary. Classification may be carried out by using a dry method as well as a wet method.

The chemical formula of the compound obtained by the calcination method can be obtained by using an inductively coupled plasma (ICP) emission spectroscopic method as a measurement method, and computed from the mass difference of the powder measured before and after calcination, as a convenient method.

Suitable examples of the negative electrode active material that can be used together with the amorphous oxide negative electrode active materials represented by Sn, Si and Ge, include carbon materials that are capable of adsorption and release of lithium ions or lithium metal, as well as lithium, lithium alloys, and metals capable of alloying with lithium.

In the present invention, it is preferable to use lithium titanate, more specifically lithium titanium oxide (Li$[Li_{1/3}Ti_{5/3}]O_4$), as an active material of the negative electrode.

The amount of the negative-electrode active material mixed in the dispersion (mixture) forming the electrode mixture is not particularly limited, but the amount is preferably 60% by mass to 98% by mass and more preferably 70% by mass to 95% by mass, based on 100% by mass of the solid content.

Electroconductive Material

As for the electroconductive material, any material may be used as long as it is an electron conductive material which does not cause any chemical change in a constructed secondary battery, and any electroconductive material can be used. Usually, electroconductive materials, such as natural graphite (scale-like graphite, flaky graphite, earthly graphite, and the like), artificial graphite, carbon black, acetylene black, Ketjen black, carbon fibers, metal powders (copper, nickel, aluminum, silver (described in JP-A-63-148,554), and the like), metal fibers, and polyphenylene derivatives (described in JP-A-59-20,971) can be contained alone or as mixtures thereof. Among them, a combination of graphite and acetylene black is particularly preferred. The amount of the electroconductive material added in the dispersion (mixture) forming the electrode mixture is preferably 0.1% by mass to 50% by mass, and more preferably 0.5% by mass to 30% by mass, based on 100% by mass of the solid content. In the case of carbon or graphite, the amount of addition in the dispersion is particularly preferably from 0.5 mass % to 15 mass %.

Binder

Preferred examples of the binder include polysaccharides, thermoplastic resins, and polymers having rubber elasticity, and among them, more preferred examples include emulsions (latexes) or suspensions of starch, carboxymethyl cellulose, cellulose, diacetyl cellulose, methyl cellulose, hydroxyethyl cellulose, hydroxypropyl cellulose, sodium alginate; water-soluble polymers, such as poly(acrylic acid), poly(sodium acrylate), polyvinylphenol, poly(vinyl methyl ether), poly(vinyl alcohol), polyvinylpyrrolidone, polyacrylonitrile, polyacrylamide, poly(hydroxy(meth)acrylate), and a styrene/maleic acid copolymer; poly(vinyl chloride), polytetrafluoroethylene, poly(vinylidene fluoride), a tetrafluoroethylene/hexafluoropropylene copolymer, a vinylidene fluoride/tetrafluoroethylene/hexafluoropropylene copolymer, polyethylene, polypropylene, an ethylene/propylene/diene terpolymer (EPDM), a sulfonated EPDM, a poly(vinyl acetal) resin; (meth)acrylic acid ester copolymers containing (meth)acrylic acid esters, e.g. methyl methacrylate and 2-ethylhexyl acrylate; a (meth)acrylic acid ester/acrylonitrile copolymer; a poly(vinyl ester) copolymer containing a vinyl ester, e.g. vinyl acetate; a styrene/butadiene copolymer, an acrylonitrile/butadiene copolymer, polybutadiene, a neoprene rubber, a fluorine rubber, poly(ethylene oxide), a polyester polyurethane resin, a polyether polyurethane resin, a polycarbonate polyurethane resin, a polyester resin, a phenolic resin, and an epoxy resin. More preferred examples include a poly(acrylic acid ester)-based latex, carboxymethyl cellulose, polytetrafluoroethylene, and poly(vinylidene fluoride).

As for the binder, one kind may be used alone, or two or more kinds may be used as a mixture. If the amount of addition of the binder is too small, the retention power and the aggregating power of the electrode mixture are weakened. If the amount of addition is too large, the electrode volume increases and the capacity per unit volume or unit mass of the electrode is decreased. For such reasons, in the dispersion (mixture) forming the electrode mixture, the amount of addition of the binder is preferably from 1 mass % to 30 mass %, and more preferably from 2 mass % to 10 mass %, based on 100 mass % of the solid content.

Filler

The electrode mixture may contain a filler. Regarding the material that forms the filler, any fibrous material that does not cause any chemical change in the secondary battery of the present invention can be used. Usually, fibrous fillers formed from olefinic polymers, such as polypropylene, and polyethylene, and materials, such as glass, and carbon are used. The amount of addition of the filler is not particularly limited, but, in the dispersion (mixture) forming the electrode mixture, the amount of addition is preferably from 0 mass % to 30 mass %, based on 100 mass % of the solid content.

Current Collector

As the current collector for the positive and negative electrodes, an electron conductor that does not cause any chemical change in the non-aqueous liquid electrolyte secondary battery of the present invention is used. Preferred examples of the current collector for the positive electrode include aluminum, stainless steel, nickel, and titanium, as well as aluminum or stainless steel treated with carbon, nickel, titanium, or silver on the surface. Among them, aluminum and aluminum alloys are more preferred.

Preferred examples of the current collector for the negative electrode include aluminum, copper, stainless steel, nickel, and titanium, and more preferred examples include aluminum, copper, and copper alloys.

Regarding the shape of the current collector, a film sheet-shaped current collector is usually used, but a net-shaped material, a film sheet formed by punching, a lath material, a porous material, a foam, a material obtained by molding a group of fibers, and the like can also be used. The thickness of the current collector is not particularly limited, but the thickness is preferably from 1 μm to 500 μm. Furthermore, it is also preferable to provide surface unevenness on the surface of the current collector through a surface treatment.

Electrode mixtures for lithium secondary batteries are formed by members appropriately selected from these materials.

(Separator)

The separator that can be used in the present invention is not particularly limited as long as the separator is formed of a material which electronically insulates the positive electrode and the negative electrode, and has mechanical strength, ion permeability, and oxidation-reduction resistance at the surfaces in contact with the positive electrode and the negative electrode. Examples of such a material that may be used include porous polymer materials or inorganic materials, organic-inorganic hybrid materials, and glass fibers. These separators preferably have a shutdown function for securing safety, that is, a function of increasing resistance by blocking the voids (gaps) at 80° C. or more, and thereby cutting off the electric current, and the blocking temperature is preferably from 90° C. to 180° C.

The shape of the pores of the separator is usually circular or elliptical, and the size is from 0.05 μm to 30 μm, and preferably from 0.1 μm to 20 μm. Furthermore, as in the case of producing the material by an extension method or a phase separation method, a material having rod-shaped or irregularly shaped pores may also be used. The proportion occupied by these pores, that is, the pore ratio, is 20% to 90%, and preferably 35% to 80%.

Regarding the polymer materials described above, a single material, such as cellulose nonwoven fabric, polyethylene, or polypropylene, may be used, or a compositized material of two or more kinds may also be used. A laminate of two or more kinds of finely porous films that are different in the pore size, pore ratio, pore blocking temperature and the like, is preferred.

As the inorganic material, oxides, such as alumina, and silicon dioxide, nitrides, such as aluminum nitride, and silicon nitride, and sulfates, such as barium sulfate, and calcium sulfate, are used, and a particle-shaped or fiber-shaped material is used. Regarding the form, a thin film-shaped material, such as a nonwoven fabric, a woven fabric, or a finely porous film, is used. In the case of a thin film-shaped material, a material having a pore size of from 0.01 μm to 1 μm and a thickness of from 5 μm to 50 μm is favorably used. In addition to the independent thin film-shaped materials described above, a separator obtained by forming a composite porous layer containing particles of the inorganic substance described above, as a surface layer of the positive electrode and/or the negative electrode by using a binder made of a resin, can be employed. For example, a separator in which alumina particles having a 90% particle size of less than 1 μm are formed on both surfaces of the positive electrode as porous layers by using a binder of a fluororesin, may be used.

(Preparation of Non-Aqueous Liquid Electrolyte Secondary Battery)

As the shape of the lithium secondary battery, any form, such as a sheet form, a rectangular form, or a cylindrical form, can be applied, as described above. The (dispersion) mixture containing the positive electrode active material or the negative electrode active material is mainly used, after being applied (coated) on a current collector, dried, and compressed.

Figure 2:
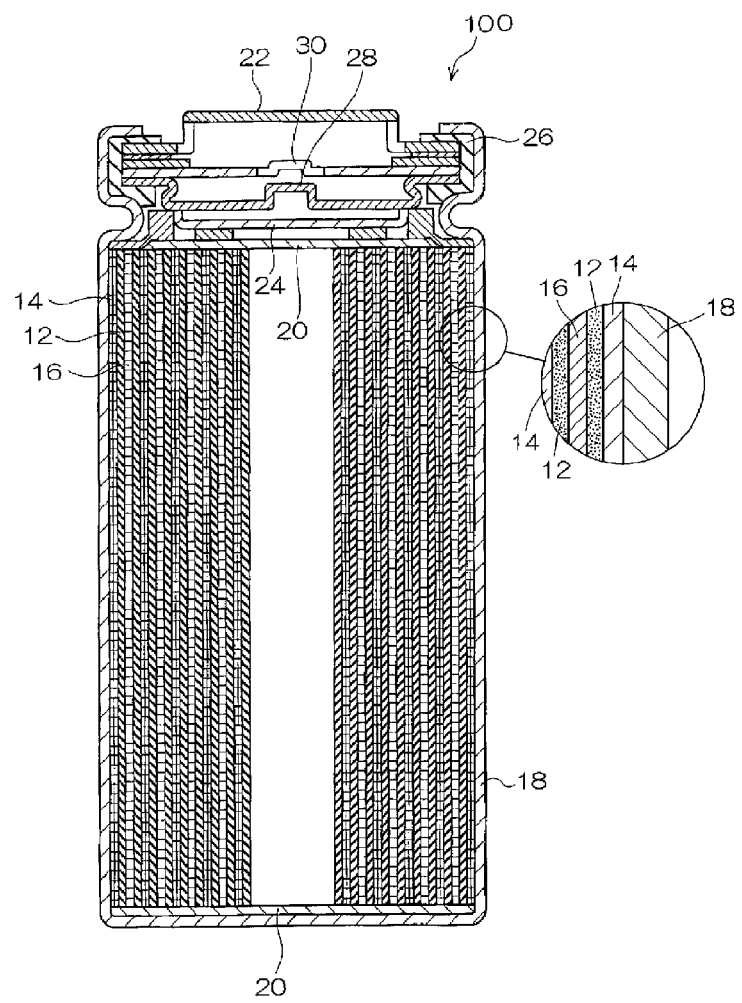
FIG. 2 is a cross-sectional diagram illustrating a specific structure of a lithium secondary battery according to a preferable embodiment of the present invention.

Hereinafter, a bottomed cylindrical lithium secondary battery 100 will be taken as an example, and its configuration and a production method thereof will be described, with reference to FIG. 2. In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This battery is a bottomed cylindrical lithium secondary battery 100 in which a positive electrode sheet 14 and a negative electrode sheet 16 that are superimposed with a separator 12 interposed therebetween, are wound and accommodated in a packaging can 18. In addition, reference numeral 20 in the diagram represents an insulating plate, 22 represents an opening sealing plate, 24 represents a positive electrode current collector, 26 represents a gasket, 28 represents a pressure-sensitive valve body, and 30 represents a current blocking element. Meanwhile, the diagram inside the magnified circle is indicated with changing hatchings in consideration of visibility, but the various members are equivalent to the overall diagram by the reference numerals.

First, a negative electrode active material is mixed with a solution prepared by dissolving a binder, a filler and the like that are used as desired in an organic solvent, and thus a negative electrode mixture is prepared in a slurry form or in a paste form. The negative electrode mixture thus obtained is uniformly applied over the entire surface of both sides of a metal core as a current collector, and then the organic solvent is removed to form a negative electrode active material layer. Furthermore, the laminate (mixture) of the current collector and the negative electrode active material layer is rolled by using a roll pressing machine or the like, to produce a laminate having a predetermined thickness, and thereby, a negative electrode sheet (electrode sheet) is obtained. At this time, the application method for each agent, the drying of applied matter, and the formation method for positive and negative electrodes may conform to the usual method.

In the present embodiment, a cylindrical battery has been explained as an example, but the present invention is not limited to this. For example, positive and negative electrode sheets (mixture) produced by the methods described above are superimposed with a separator interposed therebetween, and then the assembly may be processed directly into a sheet-like battery. Alternatively, a rectangular-shaped battery may be formed by folding the assembly, inserting the assembly into a rectangular can, electrically connecting the can with the sheet, subsequently injecting an electrolyte, and sealing the opening by using an opening sealing plate.

In all of the embodiments, a safety valve can be used as an opening sealing plate for sealing the opening. Furthermore, an opening sealing member may be equipped with any of various safety elements, in addition to the safety valve. For example, as overcurrent preventing elements, a fuse, a bimetal, a PTC element and the like are favorably used.

Furthermore, as a countermeasure for an increase in the internal pressure of the battery can, a method of inserting a slit in the battery can, a gasket cracking method, an opening sealing plate cracking method, or a method of disconnecting from a lead plate can be used, in addition to the method of providing a safety valve. Furthermore, a protective circuit incorporated with an overcharge-coping member or an overdischarge-coping member may be provided to a charging machine, or the aforementioned protective circuit may be provided independently.

For the can or the lead plate, a metal or an alloy having electrical conductibility can be used. For example, metals. such as iron, nickel, titanium, chromium, molybdenum, copper, and aluminum, or alloys thereof are favorably used.

For the welding method that may be used when a cap, a can, a sheet, and a lead plate are welded, any methods (for example, an electric welding method using a direct current or an alternating current, a laser welding method, an ultrasonic welding method, and the like) can be used. As the sealing agent for sealing an opening, any of compounds, such as asphalt, and its mixture can be used.

[Use of Non-Aqueous Liquid Electrolyte Secondary Battery]

The non-aqueous liquid electrolyte secondary batteries of the present invention are applied to various applications since the secondary batteries have satisfactory cycling characteristics.

There are no particular limitations on the application embodiments for the non-aqueous liquid electrolyte secondary battery of the present invention, but in the case of mounting the battery on electronic equipment, examples of the equipment include notebook computers, pen-input computers, mobile computers, electronic book players, mobile phones, cordless phone handsets, pagers, handy terminals, portable facsimiles, portable copying machines, portable printers, headphone stereo sets, video movie cameras, liquid crystal television sets, handy cleaners, portable CD players, mini disc players, electric shavers, transceivers, electronic organizers, calculators, memory cards, portable tape recorders, radios, backup power supplies, and memory cards. Other additional applications for consumer use include automobiles, electromotive vehicles, motors, lighting devices, toys, game consoles, load conditioners, timepieces, strobes, cameras, and medical devices (pacemakers, hearing aids, shoulder massaging machines, and the like). Furthermore, the battery can be used as various batteries for munitions or space batteries. Also, the battery can be combined with a solar cell.

The metal ion that may be used for charge transport in the secondary battery is not particularly limited, but it is preferable to use the ion of a metal belonging to Group 1 or 2 of the periodic table. Among them, ions, such as lithium ion, sodium ion, magnesium ion, calcium ion, and aluminum ion, are preferably used. As for the general technical matters on secondary batteries using lithium ions, a lot of literatures and books including the 'Patent Literatures' mentioned at the beginning of the specification are published and referenced therefor. In addition, Journal of Electrochemical Society; Electrochemical Science and Technology (US, 1980, Vol. 127, pp. 2097-2099) and the like can be referenced for the secondary battery using sodium ions. Nature 407, pp. 724-727 (2000) and the like can be referenced for magnesium ion. J. Electrochem. Soc., Vol. 138, 3536 (1991) and the like can be referenced for calcium ion. The present invention is preferably applied to lithium ion secondary batteries because they are widely spread, but the present invention also has desired effects on other batteries than the lithium ion secondary batteries and should not be construed as being limited thereto.

EXAMPLES

Hereinafter, the present invention will be described in more detail with reference to examples, but the present invention is not limited to these examples.

Example 1/Comparative Example 1

Preparation of Liquid Electrolyte

The additives (compounds), as shown in Table 1, were added to a liquid electrolyte of 1M $LiPF_6$ ethylene carbonate/diethyl carbonate at a volume ratio of 1:2, in the addition amount described in Table 1, to prepare a test liquid electrolyte. Herein, the addition amount is expressed in units of percent by mass in a whole liquid electrolyte. All viscosities at 25° C. of the thus-prepared liquid electrolytes were 5 mPa·s or less.

Preparation of 2032-Type Coin Battery (Battery Having Lithium Nickel Manganese Cobaltate Electrode)

A positive electrode was produced by using an active material: lithium nickel manganese cobaltate ($LiNi_{1/3}Mn_{1/3}Co_{1/3}O_2$) 85% by mass, a conductive aid: carbon black 7% by mass, and a binder: PVDF (poly(vinylidene fluoride)) 8% by mass, and a negative electrode was produced by using an active material: Gr (natural graphite) 92% by mass, and a binder: PVDF 8% by mass. A separator was made of 25-μm thick polypropylene. A 2032-type coin battery was produced for the respective test liquid electrolyte by using the above-mentioned positive and negative electrodes and separator, to evaluate the following items. The results are shown in Table 1.

<Liquid Electrolyte Characteristics (Impurities Peak)>

Using the 2032-type coin battery thus-produced, in a thermostatic chamber at 30° C., the battery was subjected to constant current charging at 1 C until the battery voltage reached 4.3 V at 2.0 mA, then to charging at a constant voltage of 4.3 V until the current value reached 0.12 mA or for 2 hours, and then to constant current discharging at 1 C until the battery voltage reached 2.7 V at 2.0 mA. This was defined as one cycle. After repeating this process 300 cycles, the battery was taken apart and the liquid electrolyte therein was gotten out of the battery. Then, this liquid electrolyte was subjected to a purity determination using a liquid chromatography LC-6A, manufactured by Shimadzu Corporation. At that time, evaluation was conducted in terms of peak area % of substances other than the added additives, with respect to the whole area, and the criteria are:

AA: The peak area % was within a range of from 0 to 1% (a good system in which almost no decomposed product existed)

A: The peak area % was within a range of more than 1% and 5% or less

B: The peak area % was within a range of more than 5% and 10% or less

C: The peak area % was within a range of more than 10%

<Flame Retardancy Test>

The batteries were evaluated by the following test system, with reference to UL-94HB horizontal burning test. Glass filter paper (ADVANTEC GA-100) was cut in a width of 13 mm and a length of 110 mm, and 1.7 ml of the respective thus-prepared liquid electrolyte was evenly dropped onto the entire glass filter paper. After the liquid electrolyte was sufficiently soaked into the glass filter paper, the excess liquid electrolyte was wiped, and the filter paper was suspended horizontally. The tip of the resultant filter paper was ignited for 3 seconds by being caused to come into contact with inner flame of a butane gas burner, which was adjusted to have a full flame length of 2 cm. After the filter paper was separated from the flame, the behavior thereof was observed for evaluation.

AA . . . Non-flammable or instant flame-out level

A . . . A flame was observed for a little while after ignition, but flame-out before spread of flame all over the filter paper B . . . A combustion inhibition effect was observed, but it was at a level below the non-flammable or flame extinction level C . . . A level at which no combustion inhibition effect was observed <Capacity Maintaining Ratio—Cycle Test>

The 2032-type coin battery prepared by the above method was charged by a constant current at 1 C in a thermostatic chamber at 30° C. until the battery voltage became 4.3 V at 2.0 mA. Thereafter, the battery was charged until the value of current became 0.12 mA at a constant voltage of 4.3 V (or charged for 2 hours). Then, the battery was discharged at a constant current of 1 C until the battery voltage became 2.7 V at 2.0 mA. The above operation was regarded as one cycle, and this cycle was repeated, to count the number of cycles in which the value of discharge capacity became 80% or less of the value of discharge capacity (mAh) of the first cycle.

Herein, as the positive electrode, the negative electrode, and the liquid electrolyte, those described in the following tables were used.

TABLE 1

| No. | Addition Fire retardant | amount mass % | Nitrile compound | Addition amount mass % (mass parts) | Negative electrode | Positive electrode | Electrolyte properties Flame retardancy | Impurity | Capacity The number of cycles |
|---|---|---|---|---|---|---|---|---|---|
| 101 | Trimethyl phosphate | 15 | Succinonitrile | 0.2 (1.3) | Gr | Mn-1 | A | A | 89 |
| 102 | Trimethyl phosphate | 15 | Glutaronitrile | 0.2 (1.3) | Gr | Mn-1 | A | A | 85 |
| 103 | Trimethyl phosphate | 15 | Malononitrile | 0.2 (1.3) | Gr | Mn-1 | A | A | 88 |
| 104 | Ph-1 | 10 | Succinonitrile | 0.4 (4.0) | Gr | Mn-1 | A | A | 91 |
| 105 | Ph-2 | 5 | Succinonitrile | 0.5 (10) | Gr | Mn-1 | AA | A | 95 |
| 106 | Ph-2 | 5 | Succinonitrile | 0.2 (4.0) | Gr | Mn-1 | AA | AA | 101 |
| 107 | Ph-2 | 5 | Succinonitrile | 0.05 (1.0) | Gr | Mn-1 | AA | A | 97 |
| 108 | Ph-2 | 5 | Glutaronitrile | 0.5 (10) | Gr | Mn-1 | AA | A | 93 |
| 109 | Ph-2 | 5 | Malononitrile | 0.5 (10) | Gr | Mn-1 | AA | A | 92 |
| 110 | Ph-3 | 5 | Succinonitrile | 0.5 (10) | Gr | Mn-1 | AA | A | 101 |
| 111 | Ph-3 | 5 | Succinonitrile | 0.1 (2.0) | Gr | Mn-1 | AA | AA | 110 |

TABLE 1-continued

| No. | Addition Fire retardant | Addition amount mass % | Nitrile compound | Addition amount mass % (mass parts) | Negative electrode | Positive electrode | Electrolyte properties Flame retardancy | Impurity | Capacity The number of cycles |
|---|---|---|---|---|---|---|---|---|---|
| 112 | Ph-3 | 5 | Succinonitrile | 0.01 (0.2) | Gr | Mn-1 | AA | A | 105 |
| 113 | Ph-3 | 5 | Glutaronitrile | 0.2 (4.0) | Gr | Mn-1 | AA | A | 101 |
| 114 | Ph-3 | 5 | Malononitrile | 0.2 (4.0) | Gr | Mn-1 | AA | A | 105 |
| 115 | Ph-4 | 5 | Succinonitrile | 0.2 (4.0) | Gr | Mn-1 | AA | AA | 107 |
| 116 | Ph-5 | 5 | Succinonitrile | 0.2 (4.0) | Gr | Mn-1 | AA | A | 101 |
| 117 | Ph-6 | 10 | Succinonitrile | 0.5 (5.0) | Gr | Mn-1 | A | A | 102 |
| C11 | — | — | Succinonitrile | 0.5 (—) | Gr | Mn-1 | C | A | 112 |
| C12 | — | — | Glutaronitrile | 0.5 (—) | Gr | Mn-1 | C | A | 110 |
| C13 | — | — | Malononitrile | 0.5 (—) | Gr | Mn-1 | C | A | 109 |
| C14 | Ph-2 | 5 | — | — | Gr | Mn-1 | A | C | 82 |

Herein, the number in a parenthesis in the section of nitrile addition amount indicates an addition amount (parts by mass) of the nitrile compound with respect to 100 parts by mass of the flame retardant.
Mn-1: $LiNi_{0.33}Mn_{0.33}Co_{0.33}O_2$
Gr: natural graphite

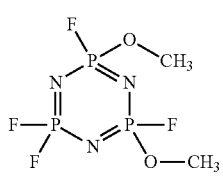

Ph-1
Phosphazene
(2OMe)

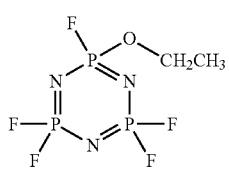

Ph-2
Phosphazene
(1OEt)

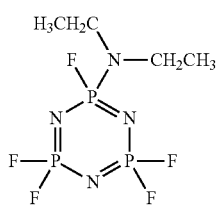

Ph-3
Phosphazene
(1NEt2)

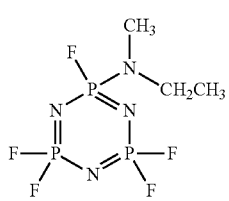

Ph-4
Phosphazene
(1NMeEt)

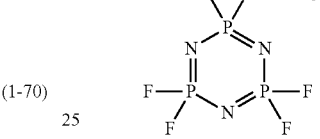

Ph-5
Phosphazene
(1NMe2)

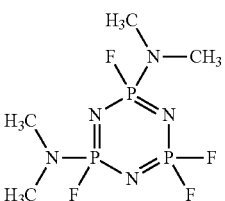

Ph-6
Phosphazene
(2NMe2)

From the results in Table 1, it is seen that the non-aqueous liquid electrolyte of the present invention for a secondary battery containing a particular flame retardant and a particular nitrile compound, allows a good balance between high-flame retardancy and high-battery performances (cycling characteristics).

Example 2/Comparative Example 2

Evaluation of battery performances was conducted in the same manner as in Example 1, except that the blend amounts of the nitrile compounds in Example 1 were changed as shown in the following table. The test labeled with the test number which is the same as that in Example 1/Comparative Example 1 means the same test as in Example 1.

TABLE 2

| No. | Fire retardant | Nitrile compound *1 | Negative electrode | Positive electrode | Electrolyte properties Flame retardancy | Impurity | Capacity The number of cycles |
|---|---|---|---|---|---|---|---|
| 105 | Ph-2 | Succinonitrile (10) | Gr | Mn-1 | AA | A | 95 |
| 106 | Ph-2 | Succinonitrile (4) | Gr | Mn-1 | AA | AA | 101 |
| 107 | Ph-2 | Succinonitrile (1) | Gr | Mn-1 | AA | A | 97 |
| 107a | Ph-2 | Succinonitrile (0.1) | Gr | Mn-1 | AA | A | 98 |
| 114 | Ph-3 | Malononitrile (4) | Gr | Mn-1 | AA | A | 105 |
| 114a | Ph-3 | Malononitrile (10) | Gr | Mn-1 | AA | A | 98 |
| 114b | Ph-3 | Malononitrile (1) | Gr | Mn-1 | AA | AA | 107 |
| 114c | Ph-3 | Malononitrile (0.1) | Gr | Mn-1 | AA | A | 97 |
| 116 | Ph-5 | Succinonitrile (4) | Gr | Mn-1 | AA | A | 101 |
| 116a | Ph-5 | Succinonitrile (10) | Gr | Mn-1 | AA | A | 93 |
| 116b | Ph-5 | Succinonitrile (1) | Gr | Mn-1 | AA | A | 95 |
| 116c | Ph-5 | Succinonitrile (0.1) | Gr | Mn-1 | AA | A | 90 |
| C21 | Ph-2 | Succinonitrile (0.05) | Gr | Mn-1 | AA | C | 81 |
| C22 | Ph-2 | Succinonitrile (12) | Gr | Mn-1 | AA | C | 80 |
| C23 | Ph-3 | Succinonitrile (0.05) | Gr | Mn-1 | AA | B | 87 |
| C24 | Ph-3 | Succinonitrile (12) | Gr | Mn-1 | AA | C | 86 |
| C25 | Ph-5 | Succinonitrile (0.05) | Gr | Mn-1 | AA | C | 81 |
| C26 | Ph-5 | Succinonitrile (12) | Gr | Mn-1 | AA | C | 82 |

*1: The number in a parenthesis in the section of nitrile compound indicates an addition amount (parts by mass) of the nitrile compound, to 100 parts by mass of the flame retardant.

From the results in Table 2, it is seen that application of the flame retardant and a particular nitrile compound in their proper amounts is of benefit.

Mn-1: $LiNi_{0.33}Mn_{0.33}Co_{0.33}O_2$
Gr: natural graphite
* In each sample, the addition amount of the flame retardant was 5 mass %.

Example 3/Comparative Example 3

The respective battery was prepared in the same manner as in Example 1, except for changing the positive electrode and the negative electrode, as shown in the following table, and using lithium cobaltate ($LiCoO_2$). Evaluation of impurity determination and battery performance of the thus-prepared battery was conducted in the same manner as in Example 1, except that the battery voltage was changed from 4.3V to 4.2V. The test labeled with the test number which is the same as that in Example 1/Comparative Example 1 means the same test as in Example 1.

TABLE 3

| No. | Fire retardant | Nitrile compound | Negative electrode | Positive electrode | Electrolyte properties Flame retardancy | Impurity | Capacity The number of cycles |
|---|---|---|---|---|---|---|---|
| 105 | Ph-2 | Succinonitrile | Gr | Mn-1 | AA | A | 95 |
| 105x | Ph-2 | Succinonitrile | Gr | $LiCoO_2$ | AA | B | 85 |
| 114 | Ph-3 | Malononitrile | Gr | Mn-1 | AA | A | 105 |
| 114x | Ph-3 | Malononitrile | Gr | $LiCoO_2$ | AA | B | 101 |
| 116 | Ph-5 | Succinonitrile | Gr | Mn-1 | AA | A | 101 |
| 116x | Ph-5 | Succinonitrile | Gr | $LiCoO_2$ | AA | B | 94 |
| C14 | Ph-2 | — | Gr | Mn-1 | A | C | 82 |

Mn-1: $LiNi_{0.33}Mn_{0.33}Co_{0.33}O_2$
Gr: natural graphite

From the results in Table 3, it is seen that the non-aqueous liquid electrolyte of the present invention for a secondary battery is compatible with a high-potential positive electrode, thereby for exerting particularly excellent effects.

Example 4

Evaluation of battery performance was conducted in the same manner as in Example 1, except that the flame retardant was changed, as shown in the following table. All of the nitrile compounds utilized in the tests means succinonitrile. The addition amount of the flame retardant was 5% by mass, and the addition amount of the surfactant was 0.2% by mass. With respect to the capacity, a test having the cycle number of more than 85 was judged to have passed the standard (to be OK). The negative electrode was natural graphite (Gr), and the positive electrode was Mn-1.

TABLE 4

| No. | Fire retardant | Electrolyte properties Flame retardancy | Im- purity | Capacity The number of cycles |
|---|---|---|---|---|
| 201 | 1-10 | A | A | OK |
| 202 | 1-11 | A | A | OK |
| 203 | 1-19 | AA | A-AA | OK |
| 204 | 1-22 | A | A | OK |

TABLE 4-continued

| No. | Fire retardant | Electrolyte properties Flame retardancy | Im- purity | Capacity The number of cycles |
|---|---|---|---|---|
| 205 | 1-27 | A | A | OK |
| 206 | 1-31 | A | A | OK |

TABLE 4-continued

| | Electrolyte properties | | | |
|---|---|---|---|---|
| No. | Fire retardant | Flame retardancy | Impurity | Capacity The number of cycles |
| 207 | 1-39 | A | A-AA | OK |
| 208 | 1-42 | A | A | OK |
| 209 | 1-45 | A | A | OK |
| 210 | 1-54 | A | A | OK |
| 211 | 1-57 | A | A | OK |
| 212 | 1-74 | A | A | OK |
| 213 | 1-75 | AA | A-AA | OK |
| 214 | 2-1 | A | A-AA | OK |
| 215 | 2-7 | A | A | OK |

From the results in Table 4, it is seen that by using the flame retardant as defined in the present invention, desired effects are obtained with a wide variety of such a flame retardant.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

C Positive electrode (positive electrode mixture)
1 Positive electrode conductive material (current collector)
2 Positive electrode active material layer
A Negative electrode (negative electrode mixture)
3 Negative electrode conductive material (current collector)
4 Negative electrode active material layer
5 Non-aqueous liquid electrolyte
6 Operating means
7 Circuit wiring
9 Separator
10 Lithium ion secondary battery
12 Separator
14 Positive electrode sheet
16 Negative electrode sheet
18 Packaging can doubles as a negative electrode
20 Insulating plate
22 Opening sealing plate
24 Positive electrode current collector
26 Gasket
28 Pressure-sensitive valve body
30 Current blocking element
100 Bottomed cylindrical lithium secondary battery

The invention claimed is:

1. A non-aqueous liquid electrolyte for a secondary battery, containing, in an aprotic solvent:
an electrolyte;
a nitrile compound represented by formula (1); and
a flame retardant composed of a phosphazene compound in an amount of 0.1% by mass to 50% by mass with respect to the whole of the non-aqueous liquid electrolyte,
wherein the nitrile compound is contained in an amount of 0.1 parts by mass to 10 parts by mass with respect to 100 parts by mass of the flame retardant:

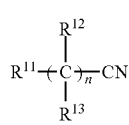

(1)

wherein $R^{11}$ to $R^{13}$ each independently represent a hydrogen atom, an alkyl group, an alkoxycarbonyl group, an aryloxycarbonyl group, a cyano group, a carbamoyl group, a sulfonyl group, a halogen atom, or a phosphony group; and n represents an integer of from 1 to 8.

2. The non-aqueous liquid electrolyte for a secondary battery according to claim 1, wherein the phosphazene compound is represented by formula (3):

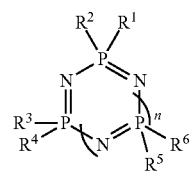

(3)

wherein $R^1$ to $R^6$ each represent a monovalent substituent; and n represents an integer of 1 to 3.

3. The non-aqueous liquid electrolyte for a secondary battery according to claim 2, wherein the phosphazene compound is represented by formula (3A) or (3B):

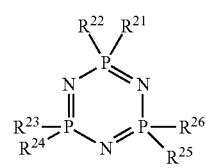

(3A)

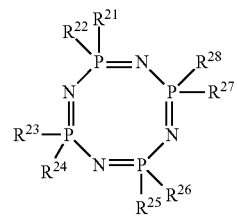

(3B)

wherein $R^{21}$ to $R^{28}$ each represent a monovalent substituent.

4. The non-aqueous liquid electrolyte for a secondary battery according to claim 3, wherein, in formulas (3A) and (3B), $R^{21}$ to $R^{28}$ each represent an alkyl group, an alkoxy group, an amino group, a fluorine atom, or a combination thereof.

5. The non-aqueous liquid electrolyte for a secondary battery according to claim 1, wherein the aprotic solvent is a compound represented by any one of formula (4A), (4B), or (4C), or a combination thereof:

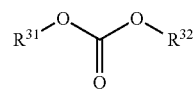

(4A)

-continued

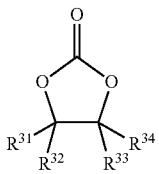
(4B)

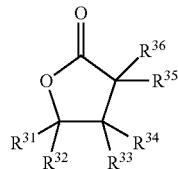
(4C)

wherein $R^{31}$ to $R^{36}$ each represent a hydrogen atom, an alkyl group, or an aryl group.

6. The non-aqueous liquid electrolyte for a secondary battery according to claim 1, wherein the nitrile compound is malononitrile, succinonitrile, glutaronitrile, or adiponitrile.

7. A non-aqueous liquid electrolyte secondary battery, comprising:
the non-aqueous liquid electrolyte for a secondary battery according to claim 1;
a positive electrode; and
a negative electrode.

8. The non-aqueous liquid electrolyte secondary battery according to claim 7, wherein the positive electrode contains an active material having manganese or nickel.

9. An additive kit for a non-aqueous liquid electrolyte for a secondary battery, containing an electrolyte in an aprotic solvent, wherein a chemical agent containing a nitrile compound represented by formula (1) is contained in combination with a flame retardant composed of a phosphazene compound, in which the nitrile compound is contained in an amount of from 0.1 parts by mass to 10 parts by mass with respect to 100 parts by mass of the flame retardant:

(1)

wherein $R^{11}$ to $R^{13}$ each independently represent a hydrogen atom, an alkyl group, an alkoxycarbonyl group, an aryloxycarbonyl group, a cyano group, a carbamoyl group, a sulfonyl group, a halogen atom, or a phosphony group; and n represents an integer of from 1 to 8; and wherein a whole of the non-aqueous liquid electrolyte contains the phosphazene compound in an amount of 0.1% by mass to 50% by mass when the additive kit is used to prepare the non-aqueous liquid electrolyte.

* * * * *